US012448955B2

(12) United States Patent
Simon et al.

(10) Patent No.: US 12,448,955 B2
(45) Date of Patent: Oct. 21, 2025

(54) DISPLACEMENT CONTROL FOR HYDRAULIC PUMP

(71) Applicant: Parker-Hannifin Corporation, Cleveland, OH (US)

(72) Inventors: Matthew H. Simon, Paw Paw, MI (US); Daniel Dyminski, Portage, MI (US); Brewce Larkin, Everett, WA (US)

(73) Assignee: Parker-Hannifin Corporation, Cleveland, OH (US)

( * ) Notice: Subject to any disclaimer, the term of this patent is extended or adjusted under 35 U.S.C. 154(b) by 205 days.

(21) Appl. No.: 18/255,795

(22) PCT Filed: Feb. 14, 2022

(86) PCT No.: PCT/US2022/016262
§ 371 (c)(1),
(2) Date: Jun. 2, 2023

(87) PCT Pub. No.: WO2022/177841
PCT Pub. Date: Aug. 25, 2022

(65) Prior Publication Data
US 2024/0003341 A1    Jan. 4, 2024

Related U.S. Application Data

(60) Provisional application No. 63/149,833, filed on Feb. 16, 2021.

(51) Int. Cl.
*F04B 1/324* (2020.01)
*F04B 1/20* (2020.01)
(Continued)

(52) U.S. Cl.
CPC ............... *F04B 1/324* (2013.01); *F04B 1/20* (2013.01); *F04B 49/002* (2013.01); *F04B 1/2078* (2013.01)

(58) Field of Classification Search
CPC .......... F04B 1/20; F04B 1/2078; F04B 1/324; F04B 49/002
See application file for complete search history.

(56) References Cited

U.S. PATENT DOCUMENTS 3,350,881 A  *  11/1967  D Amato ............... F15B 11/05
                                                     417/222.1
6,468,046 B1 *  10/2002  Du ........................ F04B 1/324
                                                     417/222.1

(Continued)

FOREIGN PATENT DOCUMENTS

CN    112343806 A  *  2/2021  ............. F04B 1/295
DE  102012015503 A1 *  2/2014  ........... F01B 3/0044
(Continued)

OTHER PUBLICATIONS

International Search Report and Written Opinion of the International Searching Authority for corresponding International Patent Application No. PCT/US2022/016262, mailed Mar. 29, 2022.

(Continued)

*Primary Examiner* — Alexander B Comley
(74) *Attorney, Agent, or Firm* — Renner, Otto, Boisselle & Sklar, LLP

(57) ABSTRACT

A variable displacement hydraulic pump including a control actuator configured to interact with a movable displacement control member to control the displacement of the pump; and a displacement control valve assembly configured to provide mechanical feedback control of positioning of the control actuator and thereby the displacement control member. The displacement control valve assembly includes a control valve member that is movable within a fluid flow path of the control valve assembly to control a flow of fluid to or from the control actuator. The control valve assembly includes a first valve part, a second valve part, and a biasing member configured to selectively position respective one or (Continued)

more portions of the first and second valve parts relative to each other to open or close a vent flow passage in response to an operating state of the pump. When in a normal operating state of the pump, the biasing member is configured to position the first and second valve parts relative to each other such that the vent flow passage is closed, and the control valve member moves in the fluid flow path to control the flow of fluid to or from the control actuator. When in a failsafe state of the pump, the biasing member is configured to position the first and second valve parts relative to each other such that the vent flow passage is opened, thereby enabling fluid from the control actuator to escape via the vent flow passage.

20 Claims, 30 Drawing Sheets

(51) Int. Cl.
*F04B 1/2078* (2020.01)
*F04B 49/00* (2006.01)

(56) References Cited

U.S. PATENT DOCUMENTS

| | | | | |
|---|---|---|---|---|
| 6,725,658 | B1* | 4/2004 | Lemmen | F04B 1/324 |
| | | | | 60/443 |
| 9,280,160 | B2* | 3/2016 | Diebold | F04B 1/324 |
| 9,670,926 | B2* | 6/2017 | Ohnishi | F04C 14/226 |
| 10,100,817 | B2* | 10/2018 | Diebold | F04B 1/324 |
| 10,914,294 | B2* | 2/2021 | Miura | F04B 49/12 |
| 2009/0288552 | A1* | 11/2009 | Beck | F04B 1/324 |
| | | | | 91/505 |
| 2015/0337829 | A1* | 11/2015 | Weihing | F15B 9/09 |
| | | | | 417/218 |
| 2019/0277275 | A1* | 9/2019 | Bethke | F04B 49/125 |
| 2020/0072205 | A1* | 3/2020 | Kroneis | F04B 53/14 |
| 2020/0256326 | A1* | 8/2020 | Kharpas | F04B 1/324 |

FOREIGN PATENT DOCUMENTS

| | | | | |
|---|---|---|---|---|
| DE | 102013224112 A1 * | 5/2015 | | F01B 3/0055 |
| DE | 102014211194 A1 * | 12/2015 | | F03C 1/0671 |
| DE | 102016216004 A1 * | 3/2018 | | F01B 3/007 |
| EP | 1220990 B1 * | 11/2005 | | F04B 1/324 |
| WO | WO-2017078852 A1 * | 5/2017 | | |
| WO | WO-2017083839 A1 * | 5/2017 | | F04B 1/2078 |

OTHER PUBLICATIONS

Second Written Opinion of the International Preliminary Examining Authority for corresponding International Patent Application No. PCT/US2022/016262, mailed Jan. 26, 2023.
International Preliminary Report on Patentability of the International Preliminary Examining Authority for corresponding International Patent Application No. PCT/US2022/016262, mailed Apr. 28, 2023.
Electronic Displacement Control (EDC) for ACE028, Eaton 220 Mobile Piston Pump Catalog, E-PUOV-TP001-E8, Aug. 2019, p. 9.
Swash Plate Type Axial Piston Pump, K3VLS Series, Electric Displacement Control (Positive Control), Kawasaki Catalog, Nov. 2018, pp. 20-21.
Axial piston variable pump, EP Electro-proportional control, A10VO series 52 and 53, Bosch Rexroth AG Catalog, RE 92703, Dec. 2015, pp. 20-21.

* cited by examiner

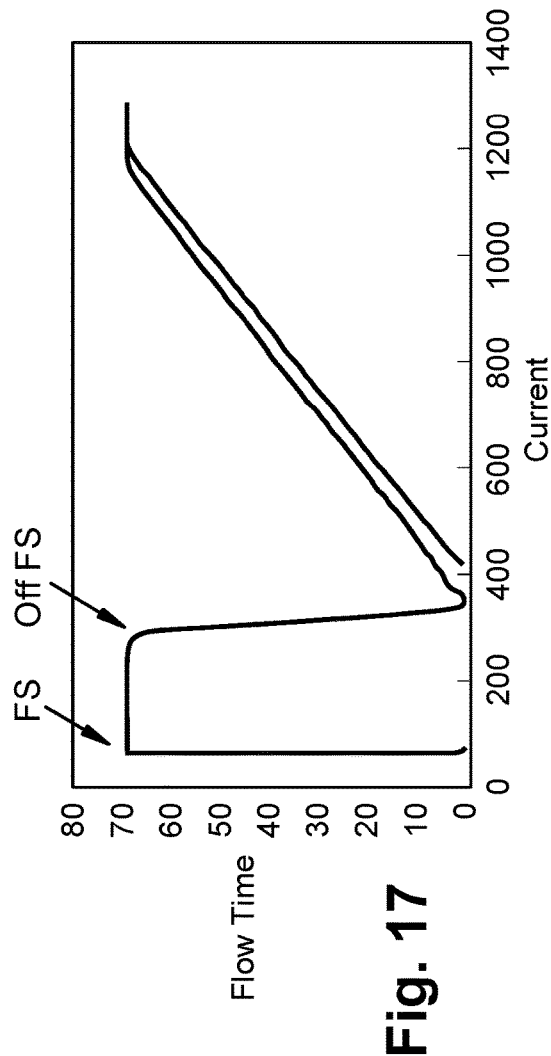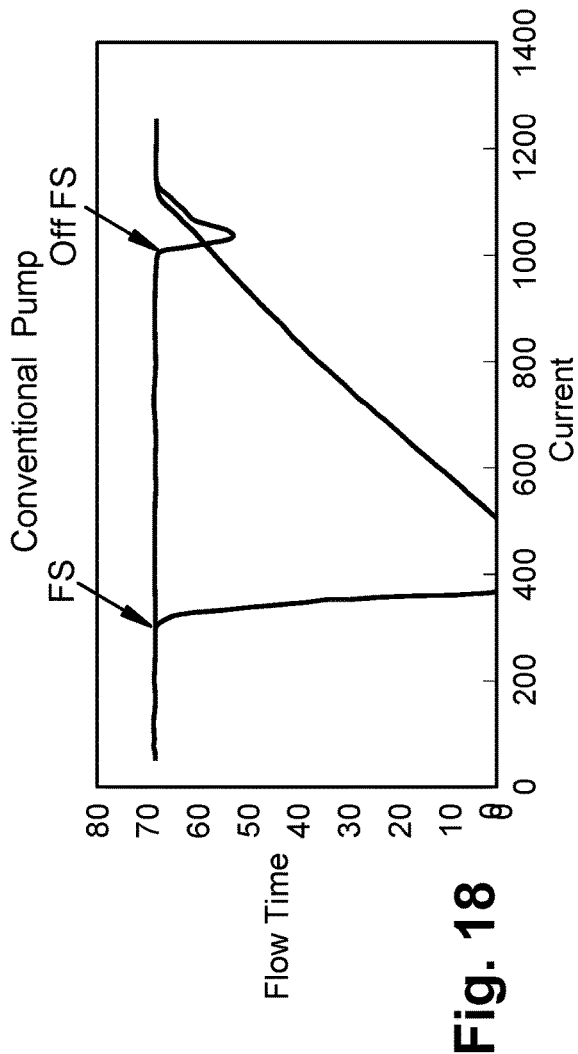

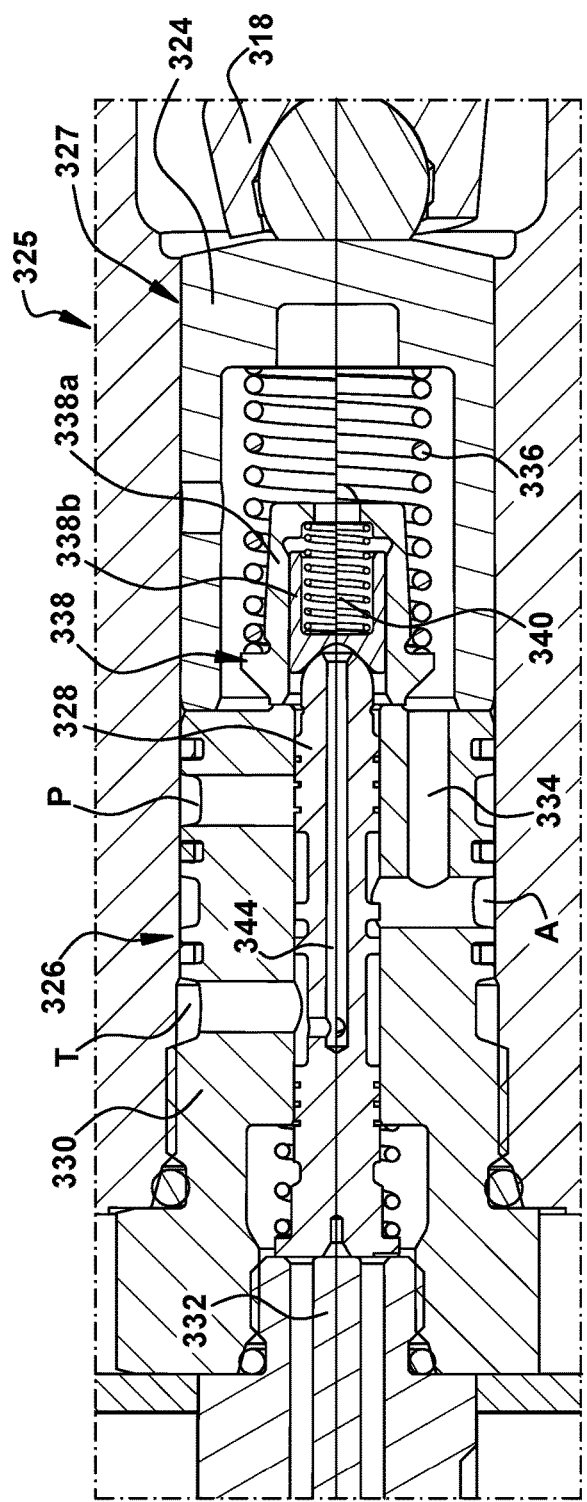
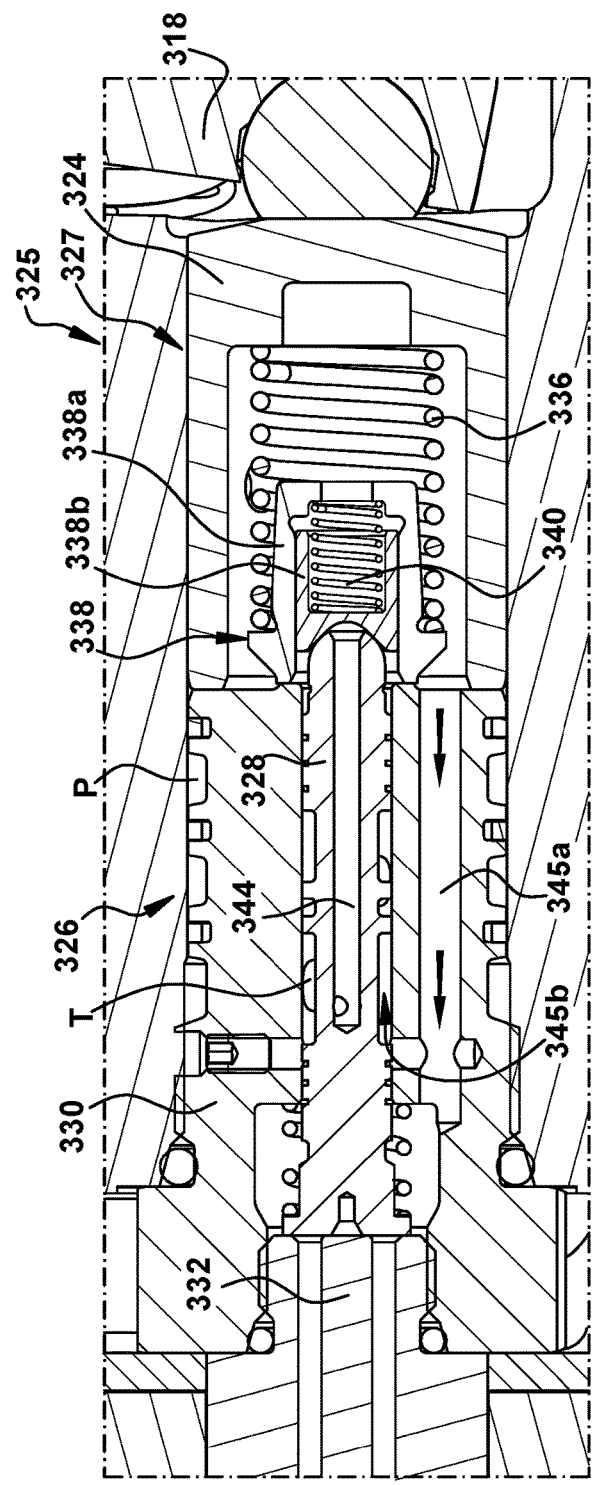
Fig. 26A
Fig. 26B

DISPLACEMENT CONTROL FOR HYDRAULIC PUMP

RELATED APPLICATIONS

This application is a national phase of International Application No. PCT/US2022/016262 filed Feb. 14, 2022, which claims the benefit of U.S. Provisional Application No. 63/149,833 filed Feb. 16, 2021, which is hereby incorporated herein by reference in its entirety.

TECHNICAL FIELD

The present disclosure relates generally to hydraulic pumps, and more particularly to control mechanisms for variable displacement hydraulic pumps.

BACKGROUND

Hydraulic fluid power systems are utilized to control motion in a variety of industries. Mining and drilling equipment, construction equipment, motor vehicle transmission systems, and various other industrial applications employ such hydraulic systems. In hydraulic control systems, a hydraulic pump converts mechanical power from a prime mover such as an internal combustion engine or electrical motor into hydraulic power which is supplied via fluid conduits to actuators which are used to control motion. The actuators may create rotary motion (e.g. hydraulic motor) or linear motion (e.g. hydraulic cylinder).

A common configuration of the hydraulic pump component of such hydraulic systems is a piston-type pump. The hydraulic piston-type pump typically includes a barrel defining cylinders and pistons reciprocating within the cylinders. An input shaft is coupled to the barrel and supplies torque for rotating the barrel. As the barrel rotates about a central axis of the input shaft, the pistons reciprocate within the cylinders of the barrel, causing hydraulic fluid to be drawn into an input port of the pump and discharged from an output port of the pump. In a variable displacement pump, the volume of fluid discharged by the pump for each rotation of the barrel (i.e., the displacement volume of the pump) can be varied to match hydraulic pressure and flow demands corresponding to the load. Typically, the displacement volume of a pump is varied by varying the stroke length of the pistons within their respective cylinders.

For a swashplate-type axial-piston pump, rotation of the hydraulic pump rotating group against a moveable swashplate creates an axial motion of the pump pistons that forces hydraulic fluid through the hydraulic porting to the downstream components of the system. Accordingly, swashplate pumps achieve variable displacement by proper positioning the swashplate, which typically is performed using one or more control actuators such as a control piston. Controlling the positioning of the control actuator, such as the control piston, will properly orient the swashplate with the desired displacement angle, and thus provide the desired amount of displacement.

SUMMARY

A common control mechanism for variable displacement hydraulic pumps is an electrical displacement control (EDC). EDCs may have a default state of maximum displacement (commonly referred to as "fail to max") when power is removed. Such EDCs typically require that the off-stroke rate be slowed down electronically to prevent inadvertent over-shooting to the "fail to max" condition. This rate slowdown is problematic, however, since a very fast off-stroke rate is generally desired to achieve satisfactory system operation. Additionally, these conventional EDCs require a high initial current to exit the fail to max condition on startup. This can be problematic during engine starting on some machines where electrical power is limited. Also, to minimize the tendency to overshoot to "fail to max," such conventional EDC valve timing is typically such that a significant percentage of the overall solenoid plunger travel is used between the metering position and the fail to max condition, which limits the valve opening during on-stroking and therefore does not allow for fast on-stroke response.

According to an aspect of the present disclosure, a control mechanism for a hydraulic pump is provided that improves upon one or more deficiencies of conventional control mechanisms such as EDCs.

More particularly, an aspect of the present disclosure provides a unique displacement control assembly for a hydraulic pump that is particularly suitable for providing mechanical feedback control of the positioning of a control actuator that controls displacement of the pump via a movable displacement control member that interacts with a rotating piston group of the pump.

According to an aspect of the present disclosure, the displacement control assembly includes a control valve member that is movable within a fluid flow path of the control assembly to control a flow of fluid to or from the control actuator, such as a control piston or the like, which controls the position of the displacement control member, such as a swashplate or the like. The control valve member includes a first valve part, such as a control spool, and a second valve part, such as cap or spring guide which may include one or more portions that interface with a nose portion of the spool. The relative position of one or more portions of the first valve part and one or more portions of the second valve part may be adjustable depending on an operating state of the pump. For example, one or more portions of the first valve part and/or the second valve part may be movable along an axis and/or movable relative to each other depending on the operating state of the pump. The control assembly further includes a biasing member, such as a spring, which may be operably coupled to the first and/or second valve parts, in which the biasing member is configured to selectively position the first and second valve parts to open or close a vent flow passage for venting fluid from the control actuator in response to the operating state of the pump. In a normal operating state of the pump, the biasing member is configured to position the first and second valve parts such that the vent flow passage is closed, and the control valve member is movable in the fluid flow path to control the flow of fluid to or from the control actuator. In a failsafe state of the pump, the biasing member is configured to position the first and second valve parts such that the vent flow passage is opened, thereby enabling fluid from the control actuator to escape via the vent flow passage, which may enable the displacement control member to move to a maximum displacement position.

According to an aspect of the present disclosure, the control assembly may further include a valve actuator operably coupled to the valve member, in which the valve actuator is configured to actuate the valve member. The valve actuator may exert an actuation force in a first direction against one side of the first valve part of the valve member, and the biasing member may exert a biasing force in a second opposite direction against an opposite side of the first valve part. In the normal operating state, the actuation force on the first valve part may be greater than the biasing force, such that the first and second valve parts are positioned to close the vent flow passage. In the failsafe state, the actuating force on the first valve part may be less than biasing force, such that the first and second valve parts are positioned to open the vent flow passage.

According to one aspect of the present disclosure, a hydraulic pump includes: a piston rotating group comprising a plurality of reciprocating pistons configured to displace a volume of hydraulic fluid from the pump; a movable displacement control member that is configured to move within a displacement range to interact with the pistons and vary the displacement of the pump; a control actuator configured to interact with the movable displacement control member to control the position of the displacement control member within the displacement range; and a displacement control valve assembly configured to provide mechanical feedback control of positioning of the control actuator and thereby the displacement control member; wherein the displacement control valve assembly includes a control valve member that is movable within a fluid flow path of the control valve assembly to control a flow of fluid to or from the control actuator, the control valve assembly including a first valve part, a second valve part, and a biasing member configured to selectively position one or more portions of the first valve part and one or more portions of the second valve part relative to each other to open or close a vent flow passage in response to an operating state of the pump; wherein in a normal operating state of the pump, the biasing member is configured to position the one or more portions of the first valve part and the one or more portions of the second valve part relative to each other such that the vent flow passage is closed, and the control valve member is movable in the fluid flow path to control the flow of fluid to or from the control actuator; and wherein in a failsafe state of the pump, the biasing member is configured to position the one or more portions of the first valve part and the one or more portions of the second valve part relative to each other such that the vent flow passage is opened, thereby enabling fluid from the control actuator to escape via the vent flow passage.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects according to the present disclosure.

FIG. 17 is an X-Y chart showing further testing results of an exemplary hydraulic pump according to the present disclosure.

FIG. 18 is an X-Y chart showing further comparative testing results of a conventional pump.

FIGS. 26A and 26B are cross-sectional views taken from different angles that show the control assembly of FIG. 24 in an exemplary failsafe state.

DETAILED DESCRIPTION

The principles and aspects according to the present disclosure have particular application to pumps, such as swashplate-type axial piston hydraulic pumps, and thus will be described below chiefly in this context. It is understood, however, that principles and aspects according to the present disclosure may be used with other types of pumps, such as radial piston, axial piston bent-axis type, variable vane pumps, or the like; or with different types of operating fluids, such as air or the like.

Figure 1:
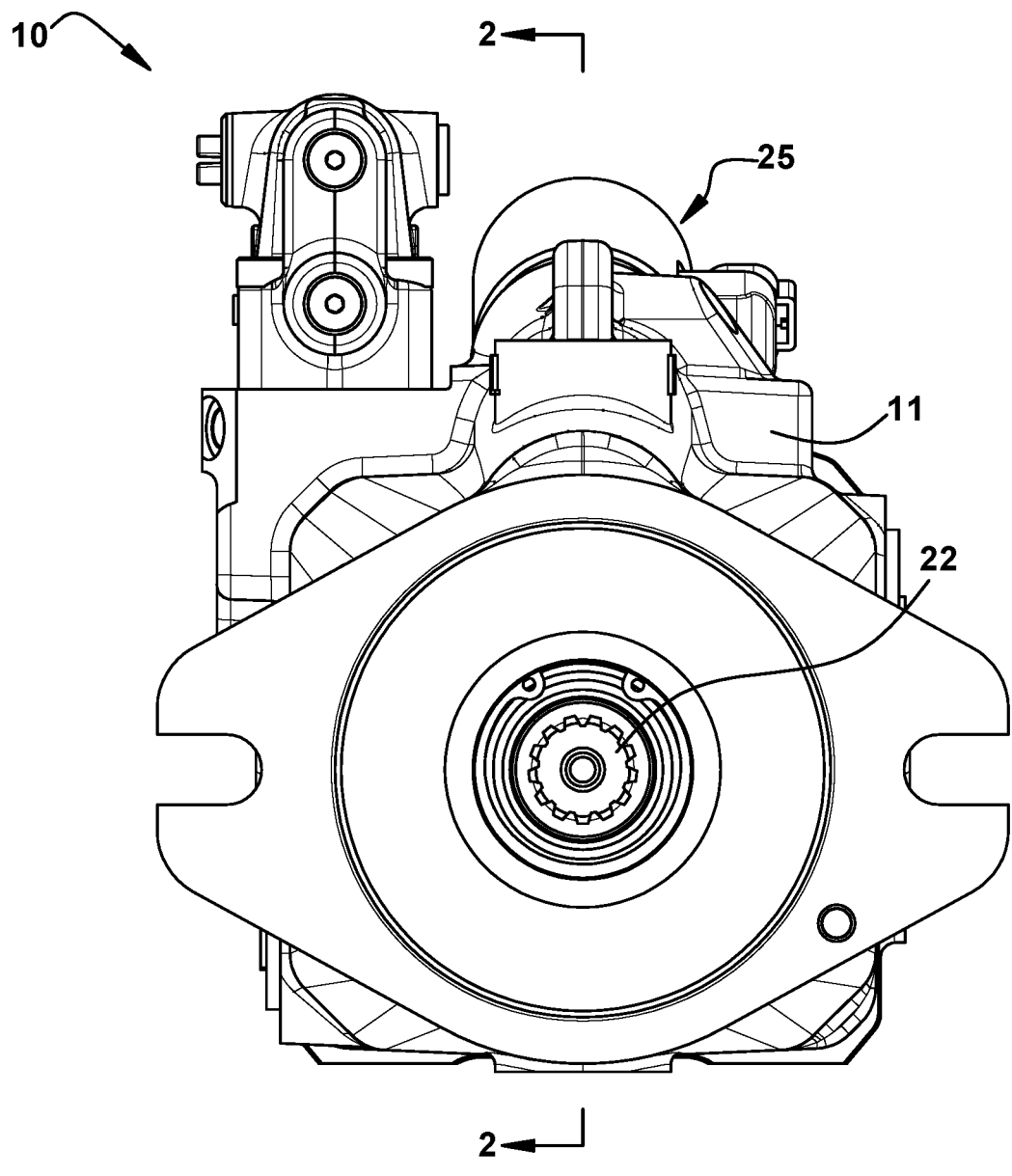
FIG. 1 is a front view of an exemplary hydraulic pump according to an embodiment of the present disclosure.
Figure 2:
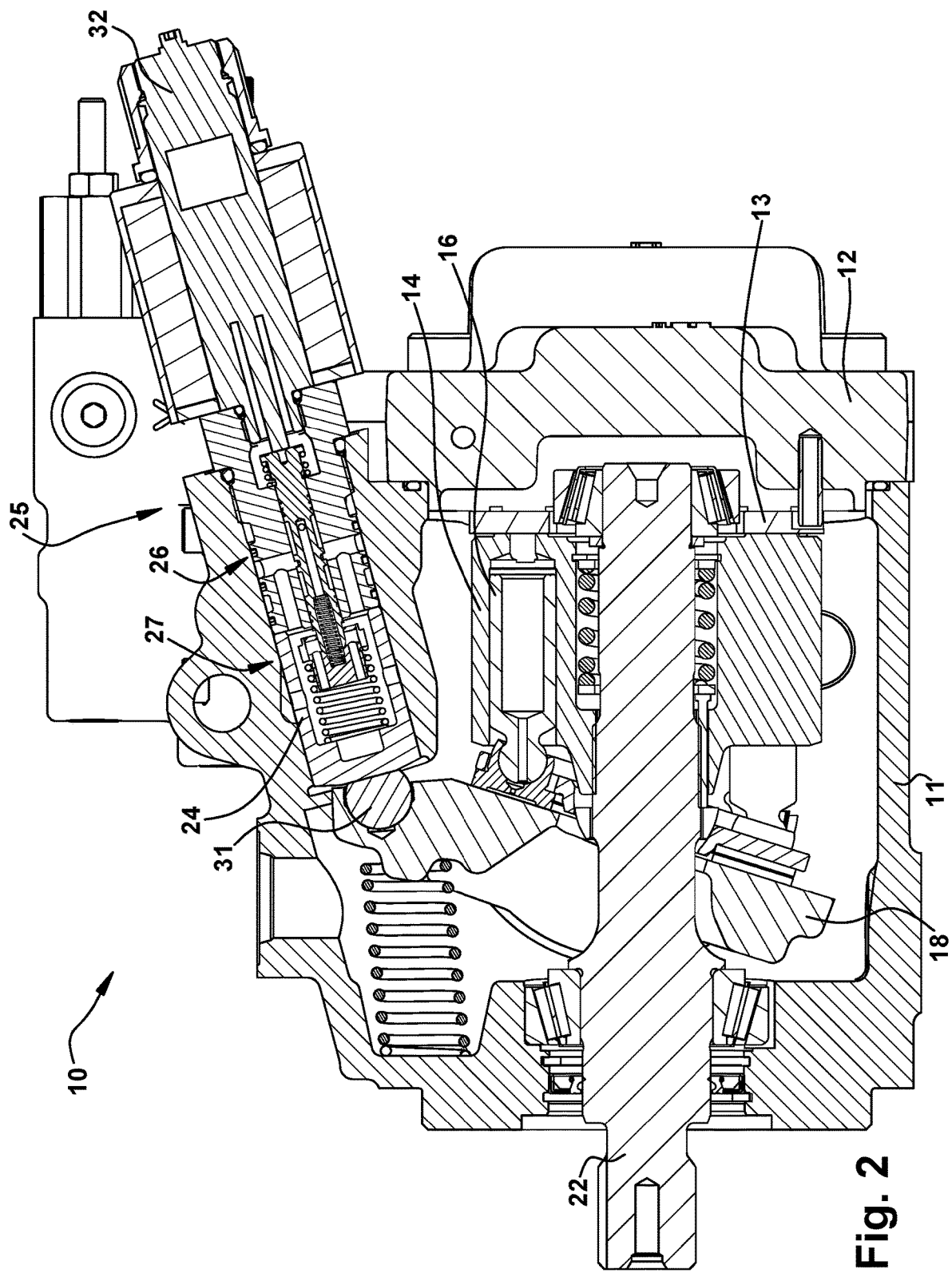
FIG. 2 is a cross-sectional side view of the hydraulic pump taken about the line 2-2 in FIG. 1.
Figure 3:
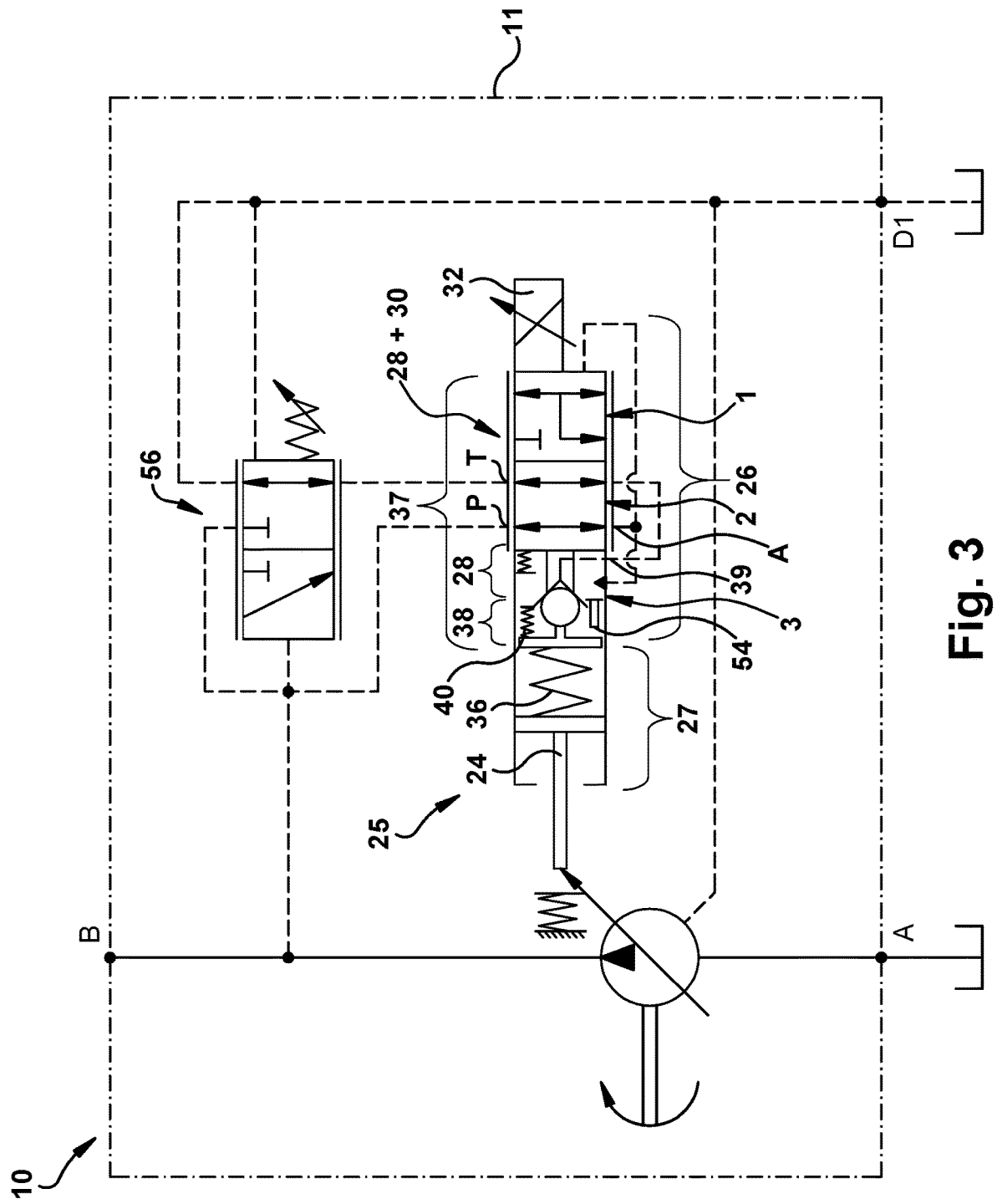
FIG. 3 is a hydraulic circuit diagram of the hydraulic pump in FIGS. 1 and 2.

Referring to FIGS. 1 and 2, an exemplary swashplate-type axial piston hydraulic pump 10 is shown. FIG. 3 illustrates a hydraulic circuit diagram of the hydraulic pump 10 shown in FIGS. 1 and 2.

In the illustrated embodiment, the hydraulic pump 10 includes a housing 11, a manifold 12, and a valve plate 13 against which a piston rotating group including a pump barrel 14 can rotate. The pump barrel 14 may house a plurality of pistons 16 that interact against a displaceable swashplate 18 that is configured to pivot within a particular displacement angle range. As the piston rotating group rotates, the interaction of the pistons 16 against the swashplate 18 creates an axial motion of the pistons that forces hydraulic fluid through hydraulic porting to the downstream components of the system. For example, the manifold 12 may include porting and physical connection structures for connecting fluid conduits such as hydraulic hose or tubing (not shown). An input shaft 22, which is driven by a prime mover, drives the rotation of the pump barrel 14 to pump the hydraulic fluid as described.

Generally, the displacement of the pump (volume per revolution) is varied by controlling the angle of the swashplate 18 to meet the demands of the hydraulic system. In exemplary embodiments, the swashplate 18 may be tilted about a pivot axis within a displacement angle range, such as from between a maximum displacement angle generally on the order of 15 to 20 degrees for maximum flow, to a minimum displacement angle that is generally zero degrees. At zero degrees, there is no reciprocation of the pumping pistons 16 in their respective bores, and therefore no output flow is produced.

As shown, a control piston 24 is configured to act on the swashplate 18 to control a displacement angle of the swashplate 18 within the displacement range. Precise control of the positioning of the control piston will properly orient the swashplate 18 to provide the desired flow rate of the pump 10. Accordingly, a displacement control assembly 25 is provided, which employs a mechanical feedback mechanism (described in more detail below) to precisely control the positioning of the control piston 24. Generally, the control piston 24 (also referred to as control actuator 24) is supplied fluid flow (e.g., hydraulic) from the discharge of the pump 10 via operation of other components of the control assembly 25 to control the position of the control piston 24.

Figure 4:
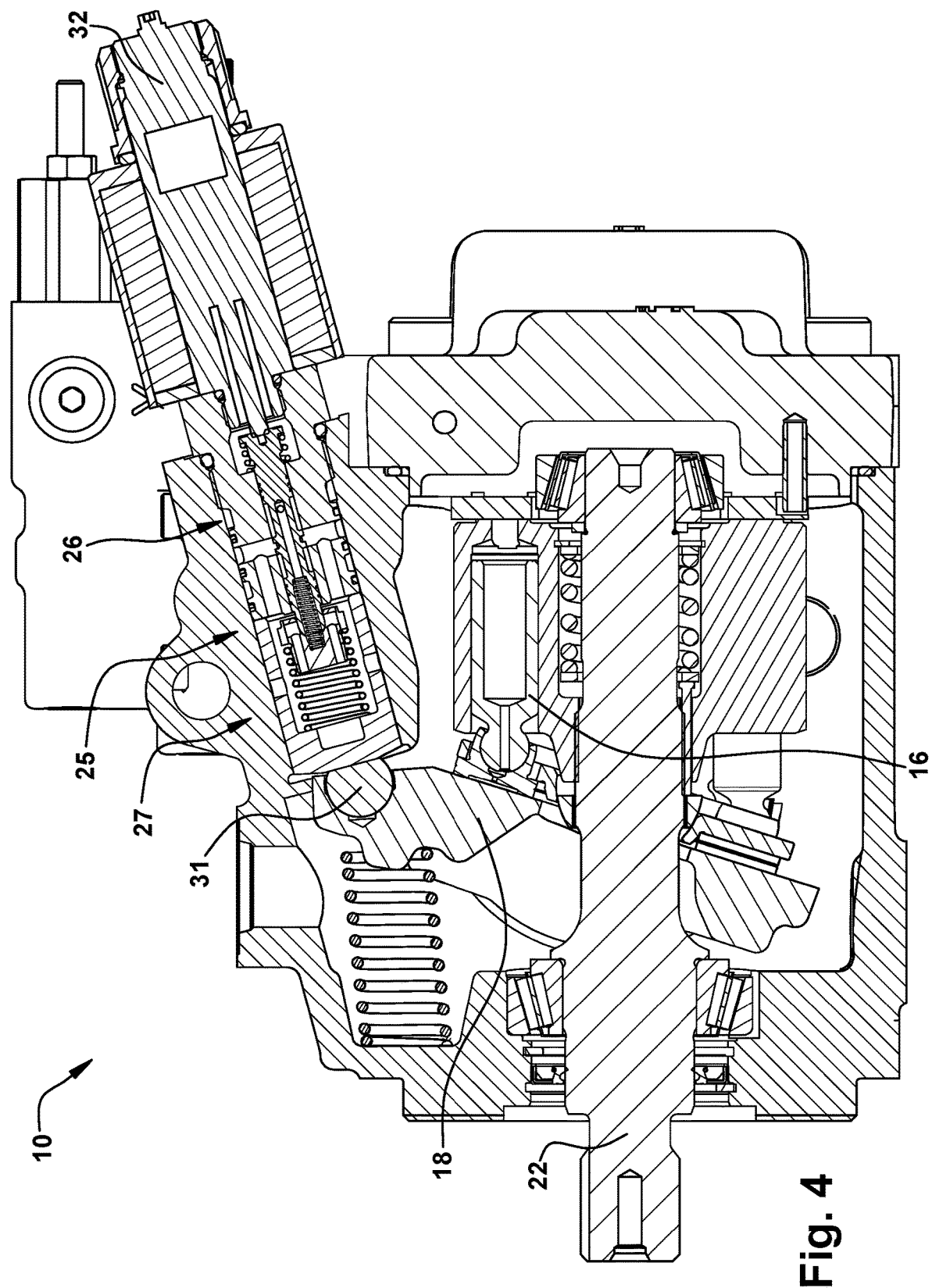
FIG. 4 is a cross-sectional side view showing the hydraulic pump of FIG. 2 in an exemplary normal operating state at maximum displacement.
Figure 5:
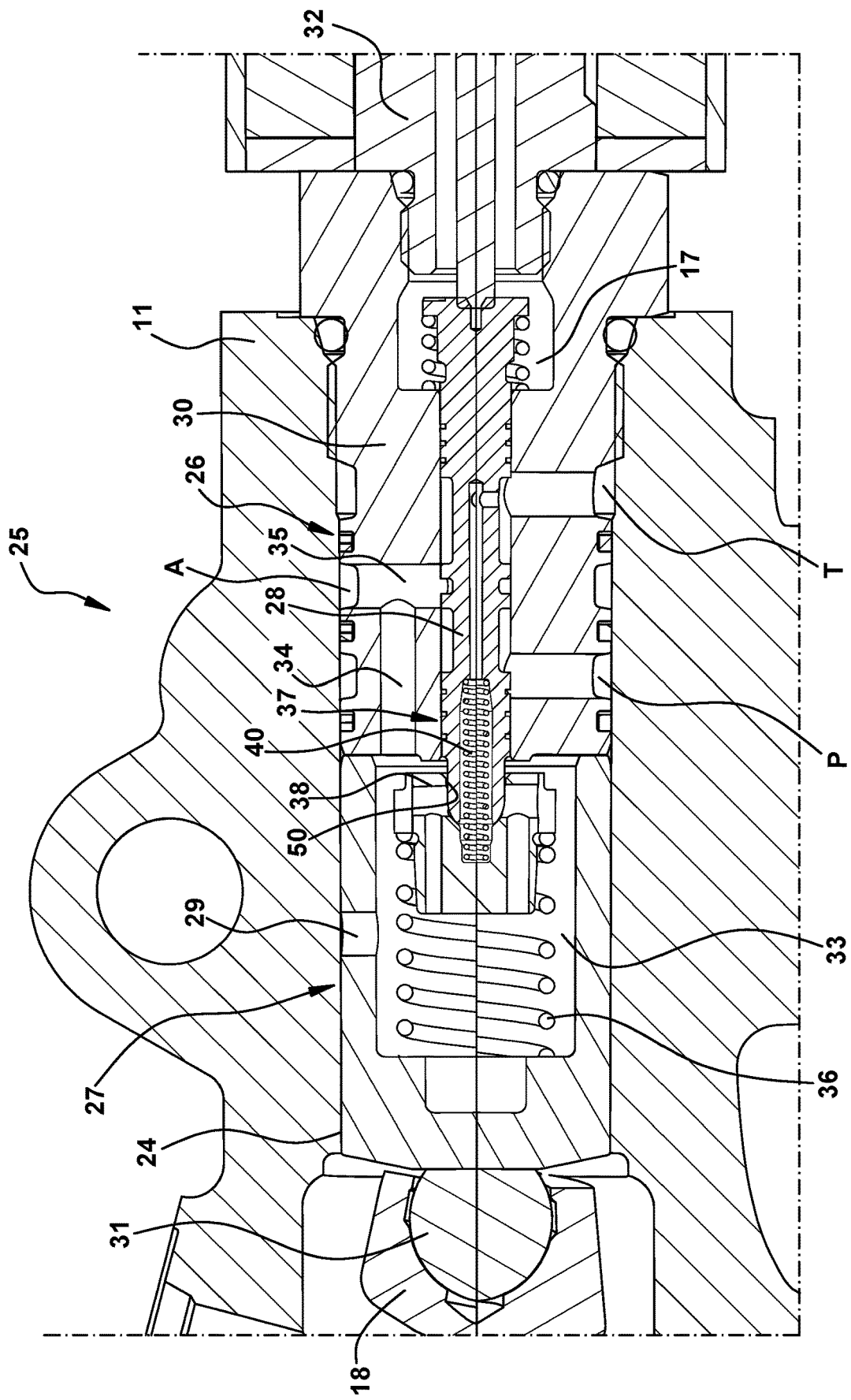
FIG. 5 is an enlarged cross-sectional quarter view taken from FIG. 4, showing a close-up view of an exemplary control assembly in the normal operating state at maximum displacement.
Figure 6:
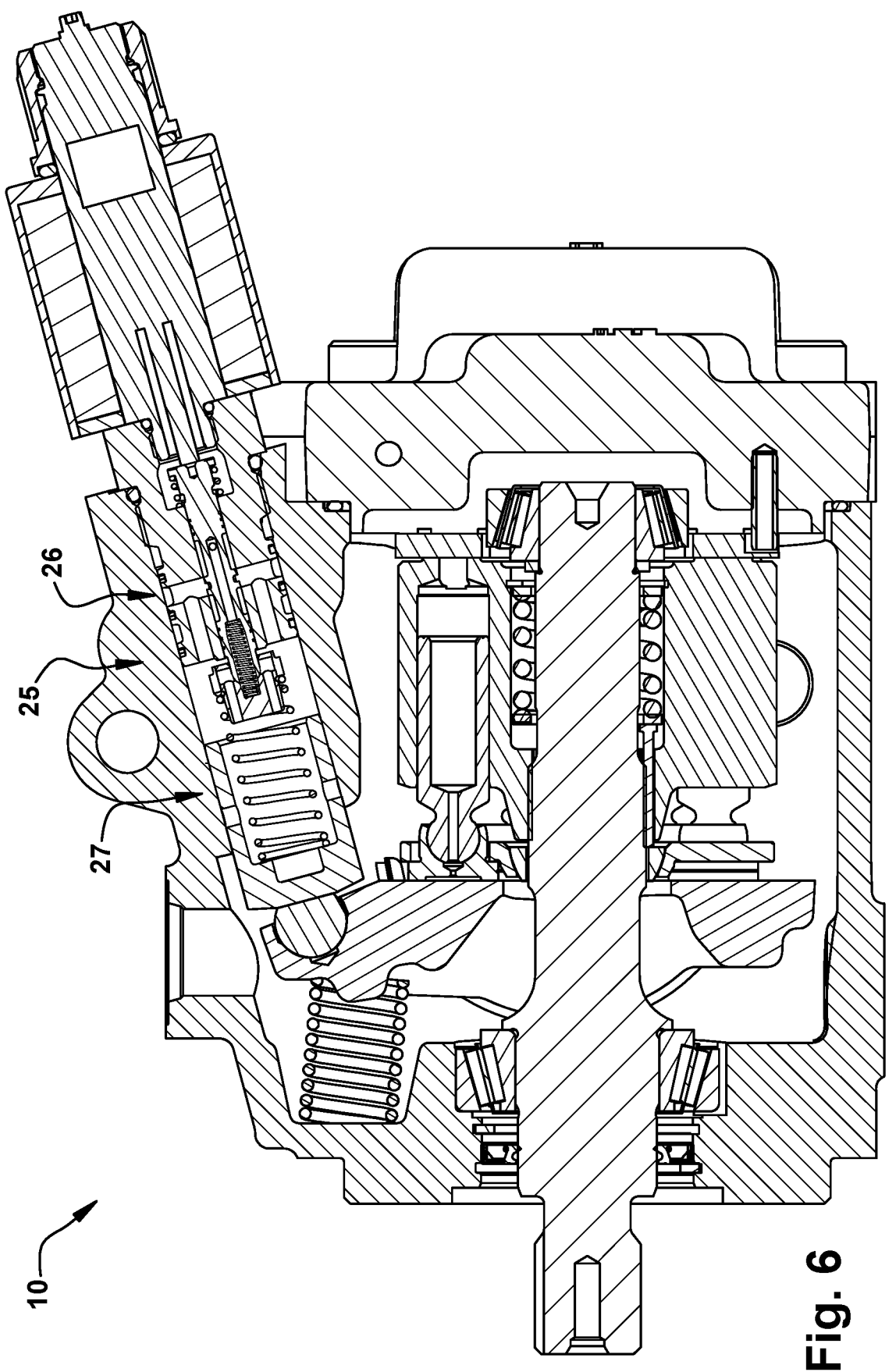
FIG. 6 is a cross-sectional side view showing the hydraulic pump of FIG. 2 in an exemplary normal operating state at minimum displacement.
Figure 7:
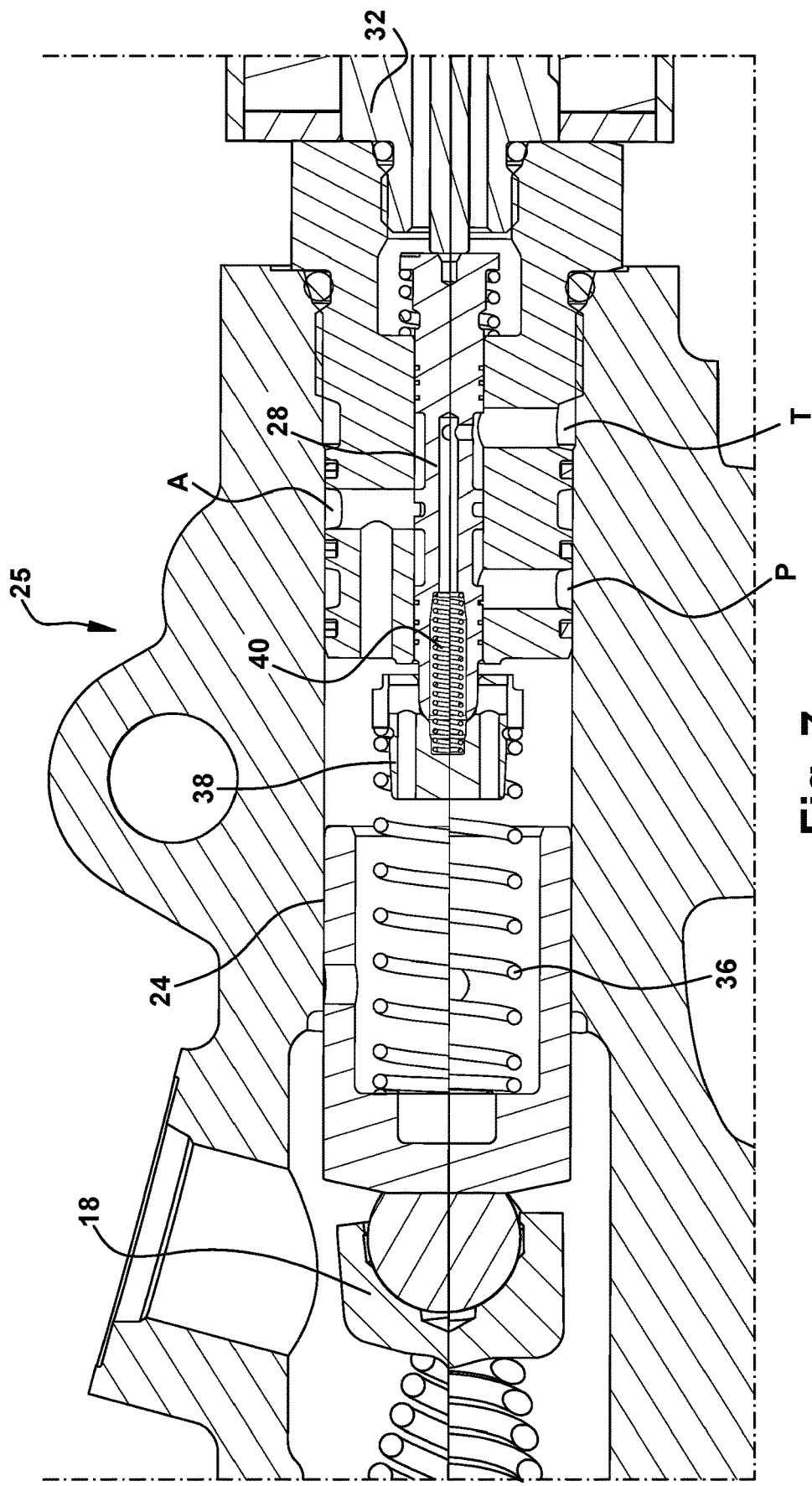
FIG. 7 is an enlarged cross-sectional quarter view taken from FIG. 6, showing a close-up view of the exemplary control assembly in the normal operating state at minimum displacement.

Referring particularly to FIGS. 4-7, an exemplary normal operating state of the pump 10 using the control assembly 25 is shown. FIGS. 4 and 5 illustrate a normal operating state at maximum displacement of the swashplate 18, in which the control assembly 25 meters the fluid flow to and from the control piston 24. FIGS. 6 and 7 illustrate a normal operating state at minimum displacement of the swashplate 18, in which the control assembly 25 meters the fluid flow to and from the control piston 24. FIGS. 5 and 7 are enlarged cross-sectional views that show the control assembly 25 in further detail.

As shown in the illustrated embodiment, the control assembly 25 generally includes a control valve assembly 26 and a control piston assembly 27. The control piston assembly 27 generally includes the control piston 24 and a feedback spring 36. As shown, the control piston 24 forms an internal cavity that contains at least a portion of the feedback spring 36, and the control piston 24 is slidably movable in a bore, such as in the pump housing 11. As described in further detail below, the internal cavity of the control piston 24 forms a fluid chamber 33 that is in fluid communication with the control valve assembly 26 to enable the control piston 24 to move within the bore and thereby control the displacement angle of the swashplate 18, such as via ball-and-socket joint 31. As shown, the control piston 24 also may have fluid passages 29 that enable internal fluid chamber of the piston 24 to vent to the pump casing.

The control valve assembly 26 generally includes a control valve member 37 movable in a fluid flow path of a valve body 30, and an actuator 32 that actuates movement of the valve member 28. In exemplary embodiments, the control valve member 37 may include first and second valve parts (or portions) that cooperate with each other and/or are movable relative to each other in certain operating states of the pump 10, as described in further detail below. In the illustrated embodiment, for example, the first valve part of the control valve member 37 is a movable control spool 28, and the valve body 30 is a control sleeve 30 that defines an internal bore for movement of the control spool 28. Also shown in the illustrated embodiment, for example, the second valve part of the valve member 37 includes a cap, which forms a spring guide 38, and includes one or more portions that interface with a nose portion of the spool 28. As shown, the spring guide 38 is operably coupled to the feedback spring 36 on one side of the spring guide 38, and is operably coupled to the control spool 28 on the opposite side of the spring guide 38. As shown with exemplary reference to FIG. 3, this second valve part (e.g., cap or spring guide 38) may form a non-return valve portion (e.g., check valve part) of the valve assembly having check valve functionality in certain conditions, such as in an hydromechanical control override condition (described in further detail below with respect to another exemplary control assembly 325). In the illustrated embodiment, the actuator 32 that actuates the control spool is a solenoid 32 that may be directly coupled to the control spool 28. It is understood, however, that the actuator 32 may be any suitable actuator, such as a linear actuator, for example a suitable electromechanical actuator; or the control spool 28 also could be moved by other means of actuation, such as a hydraulic piston, electric motor, or the like.

As discussed above, the control assembly 25 employs a mechanical feedback mechanism to precisely control the positioning of the control piston 24. In the illustrated embodiment, the feedback control is achieved by the positioning of the control spool 28, which controls the flow of fluid (e.g., hydraulic) through porting to achieve a resultant fluid pressure associated with the positioning of the swashplate 18. The porting includes a supply port P (also referred to as pressure port P) in fluid communication with a supply of fluid, a control port A that can provide a flow path of fluid (e.g., hydraulic) to and from the control piston (such as via internal fluid passages 34, 35 in the sleeve 30), and a drain port T that can provide a drain of the fluid to a tank or comparable low case pressure component. The P, A, and T ports are labeled in the close-up views of FIGS. 5 and 7, and are labeled in the fluid circuit diagram of FIG. 3. To provide pressure balancing on opposite sides of the control spool 28, the control assembly 25 may be configured to communicate fluid pressure to opposite sides of the control spool 28. For example, in the illustrated embodiment a fluid passage (hidden from view) extends through the sleeve 30 to fluidly connect the control piston chamber 33 to chamber 17 one end portion of the spool 28. The fluid pressure in the control piston chamber 33 also is exerted against the spring guide 38 which exerts force against the opposite side of the control spool 28.

In the illustrated embodiment, the mechanical feedback control for precise positioning of the control piston 24 is performed as follows with exemplary reference to FIGS. 4-7. Generally, the positioning of the control spool 28 between a first position and a second position controls a flow of fluid between the supply port P, the control port A, and the drain port T to control the flow of fluid to the control piston to provide positioning of the swashplate 18 and therefore control of pump displacement. The control spool 28 meters flow to and from the control piston 24 via the control port A that may be placed in fluid communication with either the pressurized supply port P or the low case pressure or drain port T. Generally, the normal operating state of the hydraulic pump being controlled by the control assembly 25 occurs between the states shown in the close-up views of FIGS. 4 and 6, which is shown as positions 1 and 2 of the valve member 37 in the fluid circuit diagram of FIG. 3. Such a normal operating mode may be used when the solenoid 32 is operating between 400 and 1200 mA, for example, such as for a 12 VDC solenoid. As shown in FIG. 3, in the normal operating state when the valve member 37 is in positions 1 or 2, a pressure compensator or limiter 56 may be provided to receive fluid flow and operate in a known manner.

Referring particularly to FIGS. 4 and 5, a user (or automated control mechanism) initiates a control signal as is conventional to energize the solenoid 32 to achieve positioning of the control piston 24 to cause a corresponding resultant displacement of the swashplate 18 as desired for a particular flow of hydraulic fluid through the pump 10. As the solenoid 32 current is increased, the force on the control spool 28 increases thereby urging the control spool 28 to the first position (e.g., to the left in the figures). This causes the control spool 28 to block the connection from the supply port P to the control port A, and the control port A is instead connected to the drain port T. The control spool 28 will meter the fluid flow from the control port A to the drain port T, thereby venting the fluid from the control piston 24. This allows the control piston 24 to move (e.g., right in the figures) to increase the swashplate 18 angle. The feedback spring 36 follows the swashplate 18 via the control piston 24, and this feedback spring 36 transmits its force directly to the control spool 28 via the spring guide 38. When the swashplate angle increases such that the force provided by the feedback spring 36 equals the force provided by the solenoid 32, the control valve assembly 26 closes (control spool 28 blocks ports P and T, as shown) to maintain the desired swashplate angle.

Conversely, referring to FIGS. 6 and 7, when the solenoid 32 current is decreased, the force on the control spool 28 decreases thereby urging the control spool 28 to its second position (e.g., to the right in the figures). This causes the control spool 28 to block the drain port T and connects the supply port P with the control port A. The control spool 28 will begin metering flow from the pressurized supply port P to the control port A. This porting state with P-A in fluid communication feeds flow of fluid to the control piston 24 until the control piston 24 moves sufficiently (e.g., to the left in the figures) to reduce the swashplate angle. When the swashplate angle reaches its commanded position, the force from the feedback spring 36 will equal the force from the solenoid 32, and the control valve 26 will close (control spool 28 block ports P and T, as shown) to maintain the commanded swashplate position.

To prevent loss of hydraulic power in the event of an electrical failure, a third position of the control spool 28 is provided corresponding to a failsafe mode of operation. In this failsafe state, it is often desirable for the default position of the swashplate to be at maximum displacement. This may occur, for example, in the case of an electrical failure in which power to the solenoid fails or the engine is shut off. This functionality may be desired for systems where it is necessary to maintain flow (albeit uncontrolled) to the hydraulic system in the event of an electrical failure, connector or wire failure, etc. As an example, this will allow the operator to move actuators to be able to re-position the machine for repair.

Figure 8:
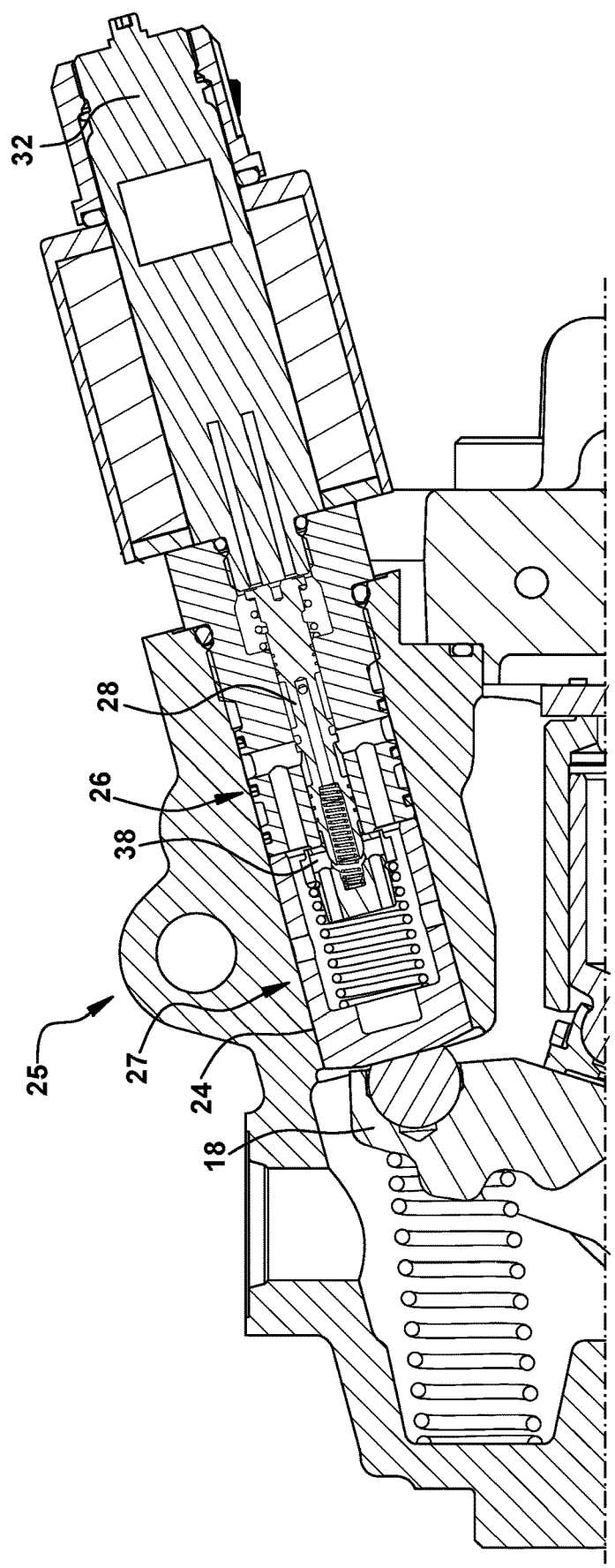
FIG. 8 is a cross-sectional side view showing the hydraulic pump of FIG. 2 in an exemplary failsafe state.
Figure 9:
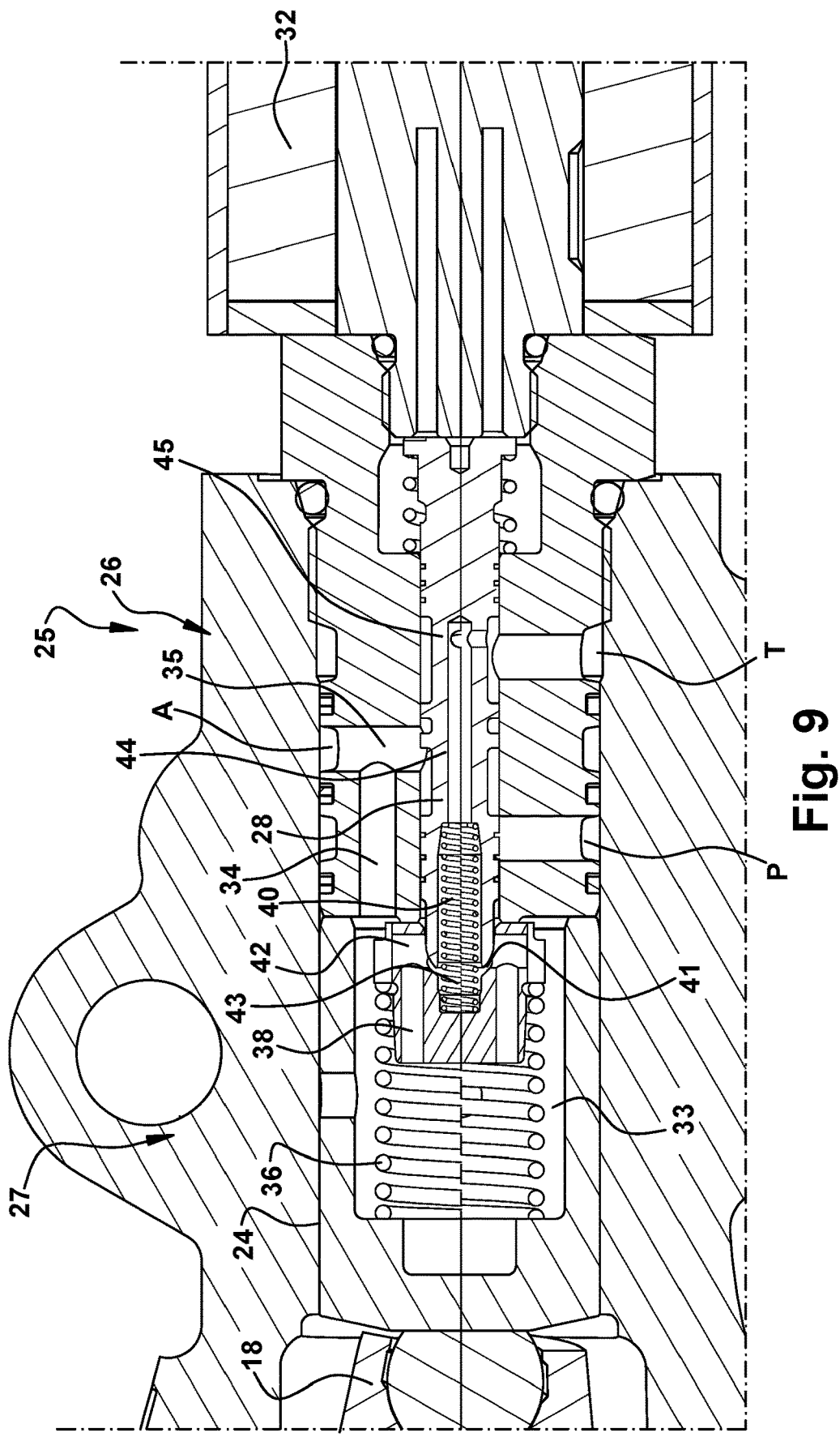
FIG. 9 is an enlarged cross-sectional quarter view taken from FIG. 8, showing a close-up view of the exemplary control assembly in the failsafe state.

Referring to FIGS. 8 and 9, an exemplary failsafe state of the control assembly 25 is shown, in which the swashplate 18 is controlled to be at maximum displacement. The failsafe state also is shown at position 3 in the illustrated fluid circuit diagram of FIG. 3. To achieve the failsafe state in the exemplary embodiment, the control valve assembly 26 includes a biasing member 40 interposed between the first and second part of the valve member 37, which in the illustrated embodiment includes the biasing member 40 being interposed between the spring guide 38 and the control spool 28. In the failsafe state, the biasing member 40 is configured to move the control spool 28 relative to the spring guide 38 to open one or more vent flow passages (e.g., 42, 43, 44, 45) that fluidly connect the internal fluid chamber 33 of the control piston 24 to the drain port T, thereby venting the fluid from the control piston 24. This allows the control piston 24 to move (e.g., right in the figures) to increase the swashplate 18 angle to maximum displacement, such that the control piston 24 engages the sleeve 30, for example.

In the illustrated embodiment, the biasing member 40 is a spring 40 having a first end portion contained in an internal cavity of the spring guide 38 and a second end portion contained in an internal cavity in the control spool 28. As shown, the biasing member 40 is configured to bias the spring guide 38 away from the control spool 28. The spring guide 38 includes internal flow passages, such as radial passages 42 and axial passage 43; and the control spool 28 includes internal flow passages, such as axial passage 44 and radial passages 45. As shown, the control spool 28 may sealingly engage against the spring guide 38, such as via engagement with a valve seat 41 of the spring guide 38. In the illustrated failsafe state, when the solenoid 32 loses power (or current is reduced below a certain amount), the force provided by the biasing member 40 against one side of the control spool 28 is greater than the force provided by the solenoid 32 against the opposite side of the control spool 28. This allows control spool 28 to move relative to the spring guide 38, thereby opening the internal flow passages 42, 43, 44 and 45 (collectively referred to as a vent flow passage 39), which allows fluid to flow from the control piston internal chamber 33 to the drain port T. In exemplary embodiments, the control spool 28 closes the P-A fluid flow path and the A-T fluid flow path in the failsafe state, and only permits venting from the internal chamber 33 via the vent flow passage (e.g., 42, 43, 44, 45). This is in contrast to the normal operating condition(s) shown with exemplary reference to FIGS. 4-7, in which the force provided by the feedback spring 36 is balanced with the force provided by the solenoid 32 (as described above), and in which the force provided by the biasing member 40 is less than the force provided by the solenoid 32 such that the vent flow passage (e.g., internal flow passages 42, 43, 44, 45 between the spring guide 38 and control spool 28) is closed.

In exemplary embodiments, the spring guide 38 and control spool 28 are rigidly coupled together during normal operation of the pump (as shown in FIGS. 4-7, for example). The rigid connection may include direct contact between the control spool 28 and spring guide 38, or a rigid intermediate piece or portion may be included between the control spool 28 and spring guide 38. In the illustrated embodiment, the spring guide 38 includes a recessed portion 50, or socket, that is configured to receive an end portion of the control spool 28 to provide a direct, rigid mechanical connection, such as via the valve seat 41. The recessed portion 50 enables improved centering and alignment of the control spool 28 with the spring guide 38. As shown in the illustrated embodiment, the recessed portion 50 is formed as a relatively deep socket such that an end portion of the control spool 28 is disposed in the recessed portion in both the normal operating condition and the failsafe condition, which may further improve the centering and alignment functionality. Alternatively or additionally, the sleeve 30 may have a centering guide (not shown) for centering the spring guide 38 relative to the control spool 28.

In conventional hydraulic pump designs using EDC, the feedback spring typically exerts a relatively large force on the control spool at greater swashplate angles. During transient off-stroke events, the control spool can be inadvertently pushed into a failsafe position if the swashplate motion towards low displacement (control piston motion) lags the movement of the control spool excessively. This is more likely to occur at lower system pressures, when swashplate motion is slower. In an attempt to minimize the probability of this undesired overshoot to failsafe occurring, conventional pump designs typically utilize the following techniques. First, a control valve is timed such that most of the solenoid plunger travel is taken up between one of the normal operating positions (e.g., a second position) and the failsafe position (e.g., a third position). A downside of this configuration is that there is very little solenoid travel remaining for the other normal operating position (e.g., first position), which results in slow on-stroke response due to small valve opening. A second technique involves electronic ramping by the hydraulic system controls to slow down the control spool motion, and therefore slowing down the pump response time (e.g., on the order of 200 msec). These solutions result in non-optimal control, and there still exists the potential to overshoot to fail safe.

Figure 10:
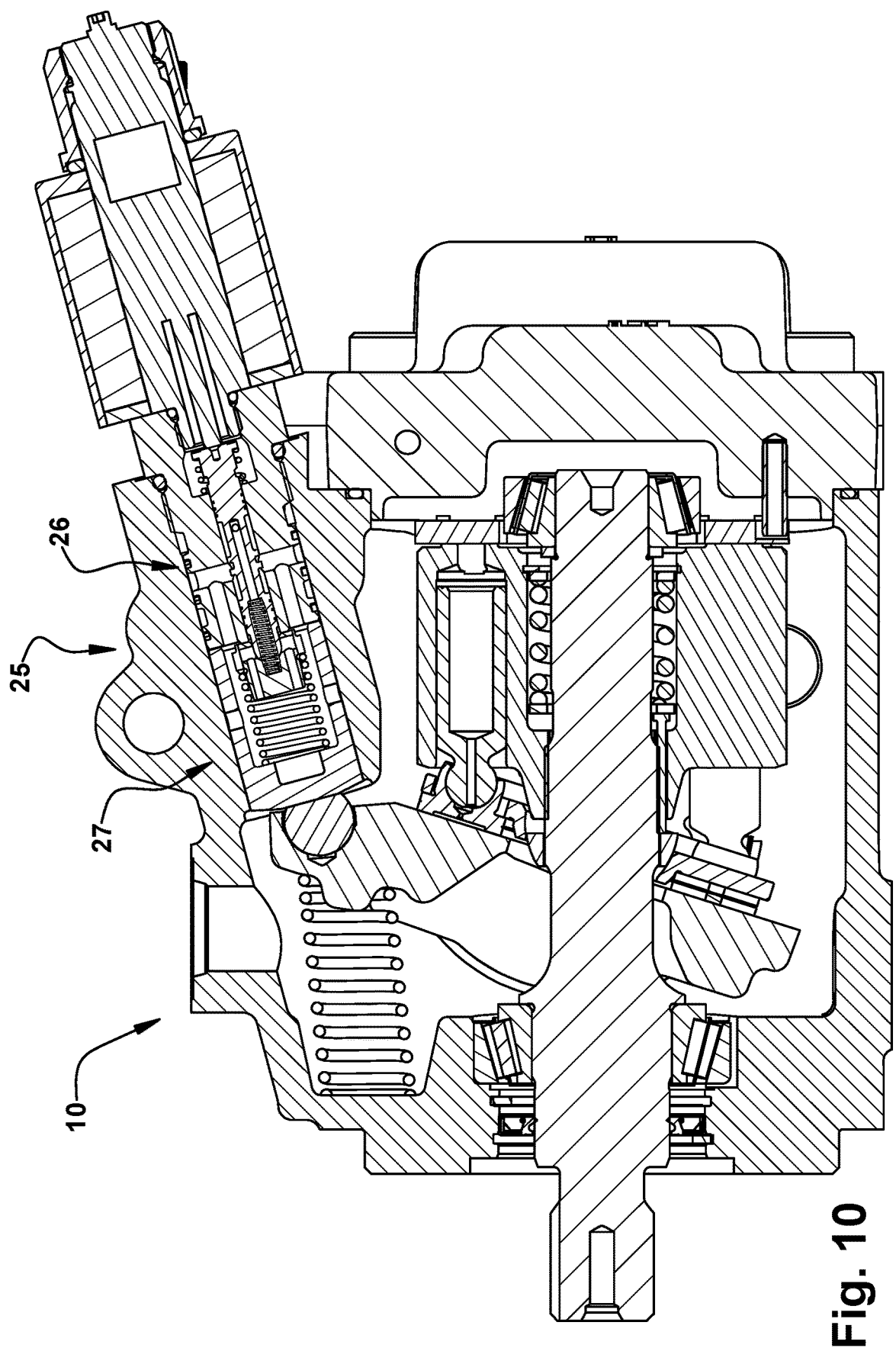
FIG. 10 is a cross-sectional side view showing the hydraulic pump of FIG. 2 in an exemplary off-stroke transient state at maximum displacement.
Figure 11:
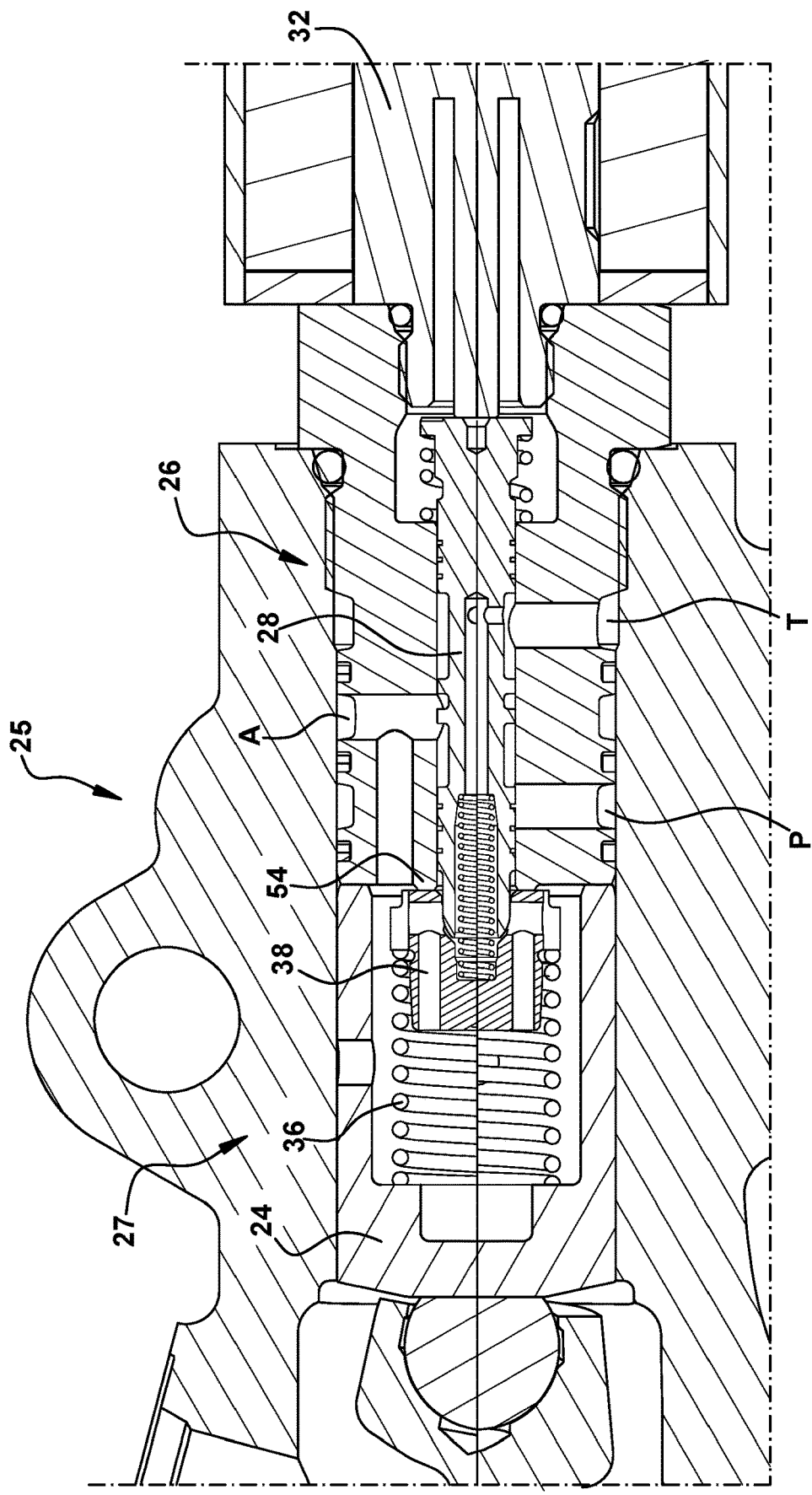
FIG. 11 is an enlarged cross-sectional quarter view taken from FIG. 10, showing a close-up view of the exemplary control assembly in the exemplary off-stroke transient state at maximum displacement.

In contrast to conventional pump designs using EDC, the hydraulic pump according to the present disclosure provides improved mechanical feedback of the control valve assembly 26. Referring particularly to FIGS. 10 and 11, an exemplary off-stroke transient condition is shown at maximum displacement of the swashplate 18. In such a transient state, the forces between the feedback spring 36 and the solenoid 32 may be out of balance, such that the force provided by the feedback spring 36 is greater than the force provided by the solenoid 32. This causes the control spool 28 to move (e.g., right in the figure) and open the flow path from the pressure port P to the control port A. As shown in the illustrated embodiment, the configuration of the control assembly 25 limits the travel of the feedback spring 36 by stopping the spring guide 38 on a stop surface 54 of the control sleeve 30 prior to the control spool 28 opening the flow path between the internal fluid passages (e.g., 42, 43, 44, 45) of the failsafe position. In this manner, the control assembly 25 will not over-shoot to the failsafe state during this transient condition, since the feedback spring 36 force does not push on the control spool 28 due to the spring guide 38 being physically stopped at the stop surface 54 of the sleeve 30. Since the solenoid 32 force at minimum command (e.g., 400 mA) exceeds the force from the biasing member 40 at the end of the control spool 28, the spool 28 and spring guide 38 are positioned relative to each other such that the vent flow passage(s) (e.g., 42, 43, 44, 45) are closed.

As described above, the biasing member 40, which may be a relatively small spring contained in the spring guide 38 and the control spool 28, provides the necessary force to move the control spool 28 to the failsafe position, in which the vent flow passage(s) (e.g., 42, 43, 44, 45) are opened to vent fluid from the control piston 24 to the drain port T. Generally, the force provided by the biasing member 40 is set less than the force from the solenoid 32 at its minimum control current (e.g., <400 mA). This helps to ensure that the total biasing force by the biasing member 40 on the control spool 28 does not exceed the solenoid force during normal operating conditions (e.g., >400 mA, including transient conditions), thereby eliminating overshooting to failsafe by keeping the spring guide 38 and control spool 28 together in the closed flow state. If power is removed from solenoid 32, however, then the biasing member 40 will push the control spool 28 (e.g., to the right in the figures) against the solenoid 32, thereby opening up the vent flow passage(s) (e.g., 42, 43, 44, 45) between the spring guide 38 and control spool 28 to vent fluid from the control piston 24 to drain T.

Figure 14:
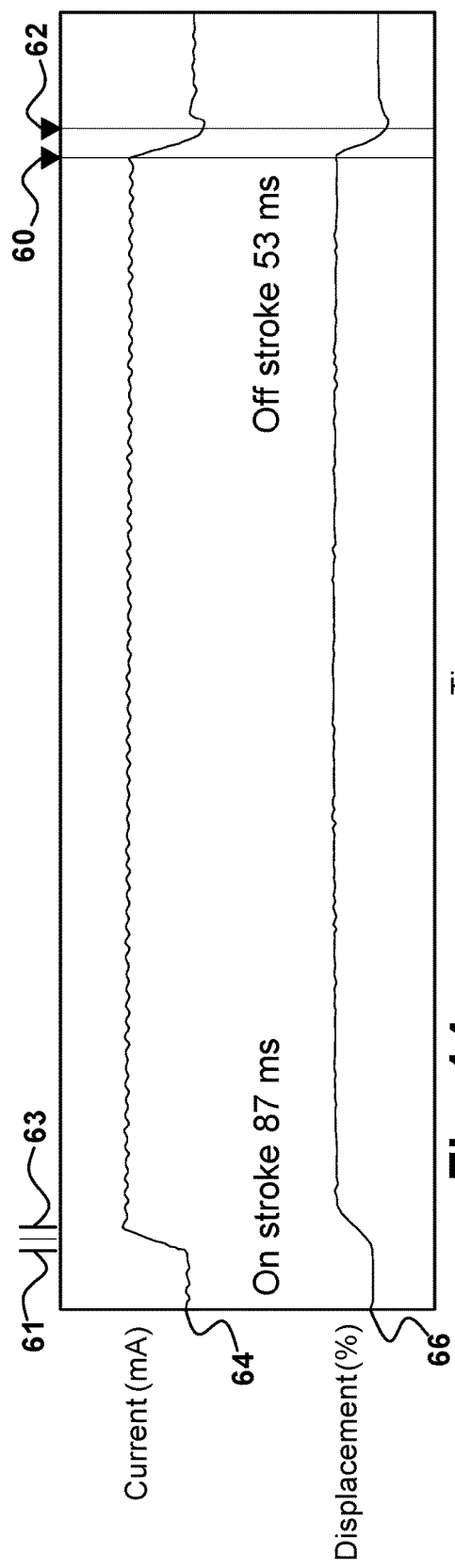
FIG. 14 is an X-Y chart showing testing results of an exemplary hydraulic pump according to the present disclosure.
Figure 15:
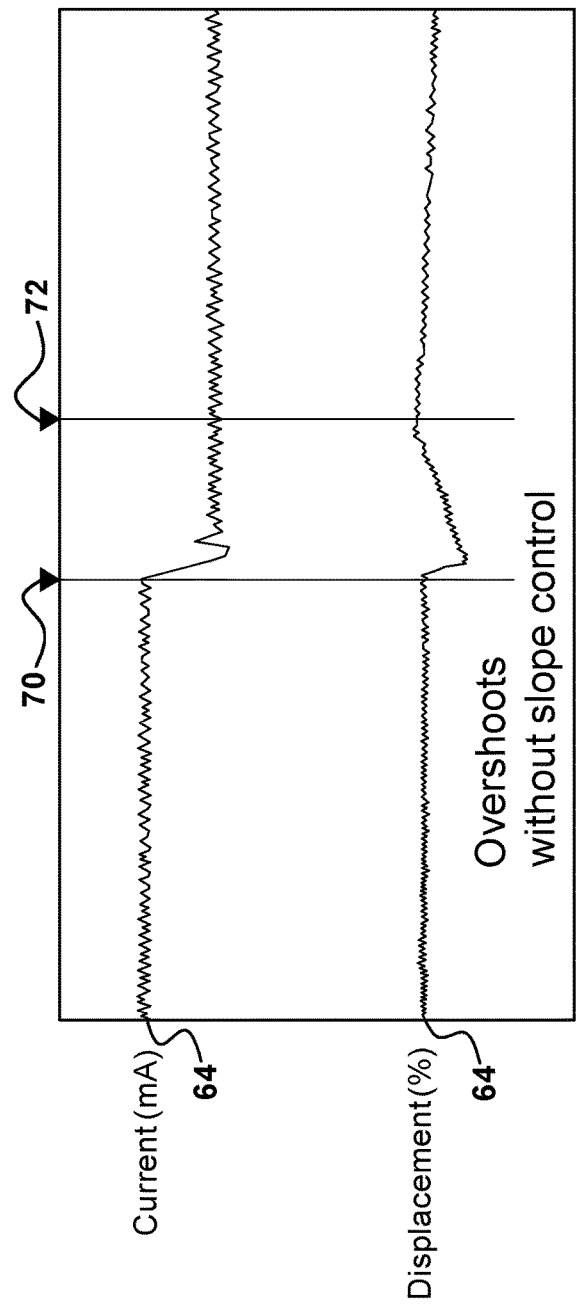
FIGS. 15 and 16 are X-Y charts showing comparative testing results of a conventional pump.

Referring to FIGS. 14 and 15, comparison data between a conventional hydraulic pump and the exemplary hydraulic pump according to the present disclosure is shown. In FIG. 14, the off-stroking state of the exemplary pump is shown at positions 60 and 62 on the X-axis of the diagram. In the illustrated diagram, the solenoid current (in mA) is shown at 64, and displacement (in %) is shown at 66. As shown in FIG. 14, the pump according to the present disclosure does not overshoot to the failsafe state during off-stroking by virtue of the mechanical features described above. This is shown by the low displacement values after off-stroking (i.e., shown following location 62 on the X-axis of the displacement trace 66). This is done without the exemplary pump using electronic ramp control of the solenoid command signal. Moreover, the pump according to the present disclosure has a fast-response rate during off-stroking (e.g., 53 msec), as shown when comparing the response time between the solenoid current (shown at 64) and measured pump displacement (shown at 66) between X-axis locations 60 and 62. In contrast, as shown between locations 70 and 72 on the X-axis in FIG. 15 of the conventional pump, when no electronic slowdown of the solenoid ramp signal is used, the control mechanism overshoots to failsafe (shown by the high displacement values at location 72 on the X-axis along the displacement trace 66, which is reflective of high swashplate angle at the failsafe state).

Figure 12:
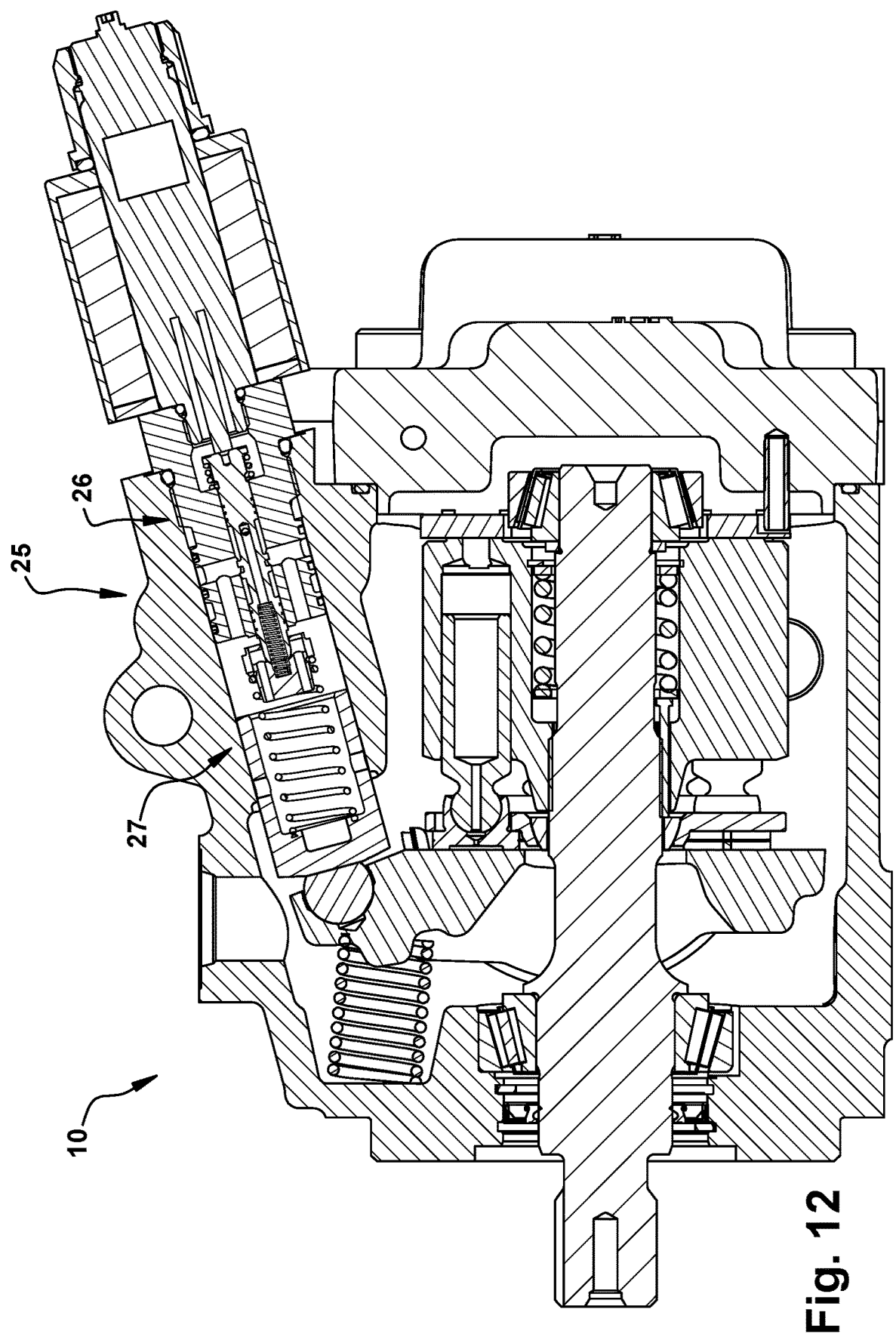
FIG. 12 is a cross-sectional side view showing the hydraulic pump of FIG. 2 in an exemplary on-stroke transient state at minimum displacement.
Figure 13:
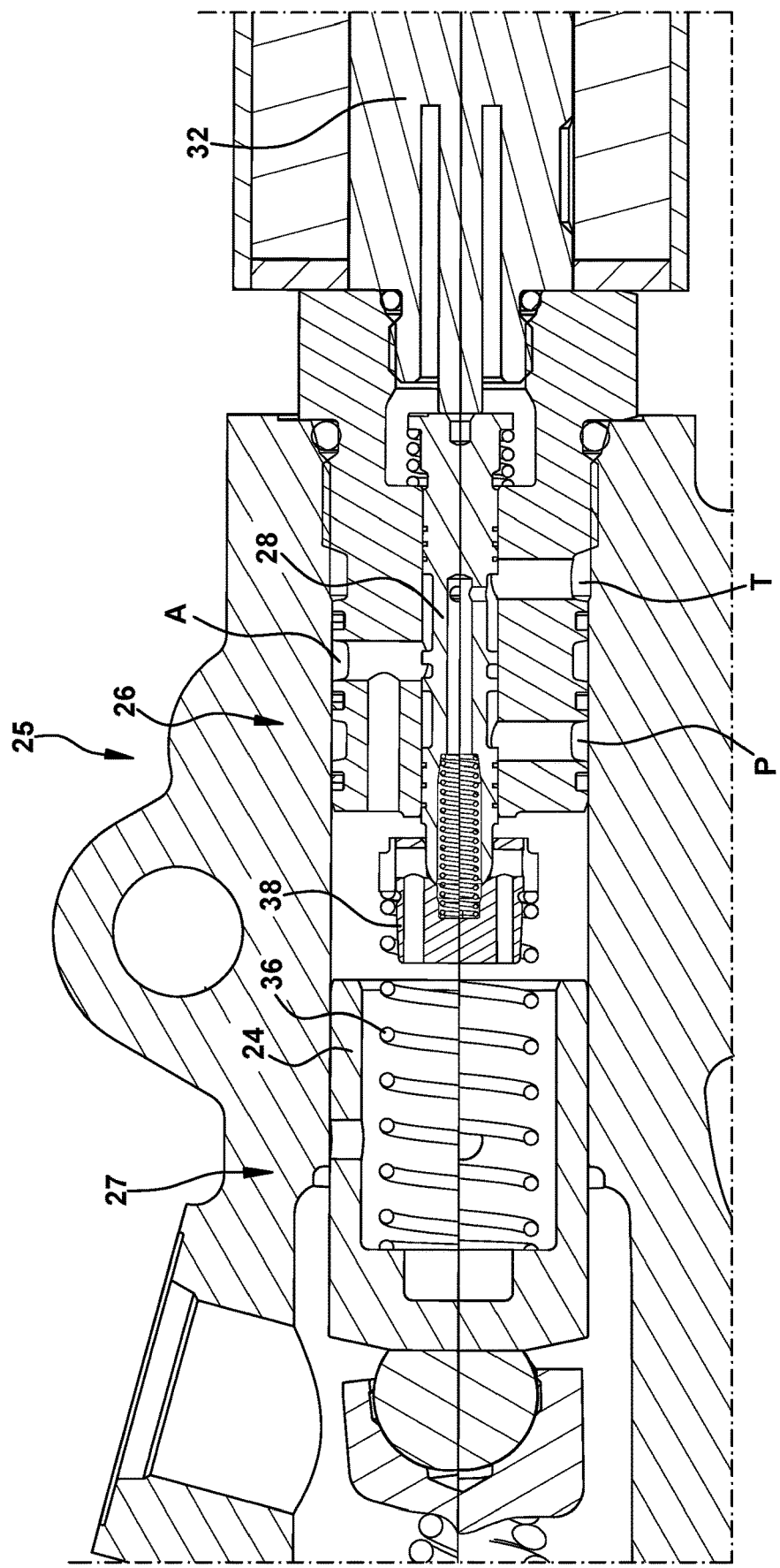
FIG. 13 is an enlarged cross-sectional quarter view taken from FIG. 12, showing a close-up view of the exemplary control assembly in the exemplary on-stroke transient state at minimum displacement.

Another advantage of the exemplary pump 10 includes faster displacement response during on-stroking transient conditions. Referring particularly to FIGS. 12 and 13, an exemplary on-stroke transient condition is shown at minimum displacement of the swashplate 18. In such a transient state, the forces between the feedback spring 36 and the solenoid 32 are out of balance, and the control spool 28 is moved (e.g., left in the figure) to open the flow path from the control port A to the drain port T. Because the force provided by the biasing member 40 on the control spool 28 is set less than force provided by the solenoid 32 at the minimum control current (e.g., <400 mA), the spring guide 38 and control spool 28 remain in rigid (e.g., direct) contact to provide this improved feedback function.

Figure 16:
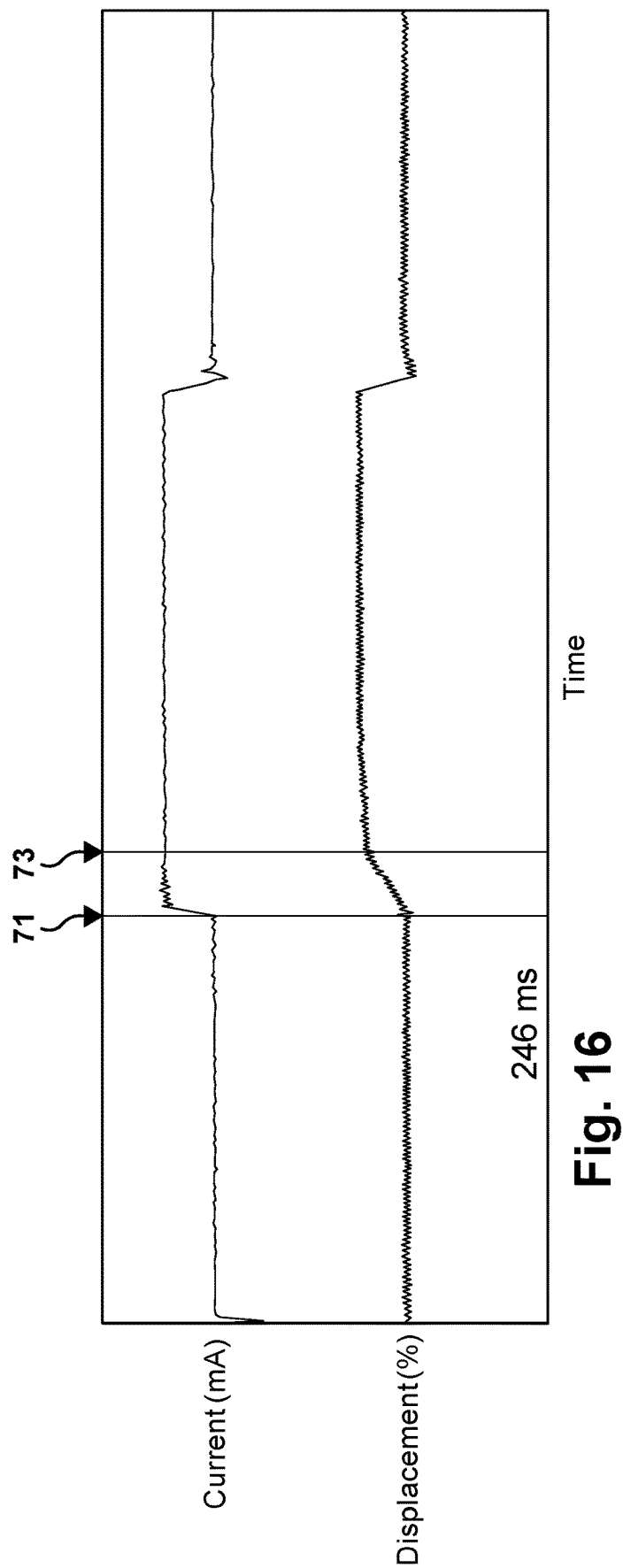

Referring to FIGS. 14 and 16, comparison data between a conventional hydraulic pump and the exemplary hydraulic pump according to the present disclosure is shown. In FIG. 14, the on-stroking state of the exemplary pump is shown between positions 61 and 63 on the X-axis of the diagram, and in FIG. 16 the on-stroking state of the conventional pump is shown between positions 71 and 73 on the X-axis. As shown in FIG. 14, the exemplary pump according to the present disclosure provides a dynamic on-stroke response by ramping to the desired displacement (as depicted by the displacement trace 66) in a time of 87 msec, compared to 246 msec for the conventional pump design (as depicted by the displacement trace 66 in FIG. 16).

Another advantage of the exemplary pump 10 is a lower current requirement of the solenoid 32 to exit the failsafe condition during start-up, as the solenoid 32 only needs to overcome the biasing force from the relatively small biasing member 40 (e.g., spring) to exit fail-safe.

Referring to FIGS. 17 and 18, comparison data between a conventional hydraulic pump (FIG. 18) and the exemplary hydraulic pump according to the present disclosure (FIG. 17) is shown. In FIG. 17, the amount of current required to move from the failsafe state to the non-failsafe state for the exemplary pump is approximately 300 mA. In contrast, as shown in FIG. 18, the amount of current required to move from the failsafe state to the non-failsafe state for the conventional pump is over 1,000 mA.

Figure 19:
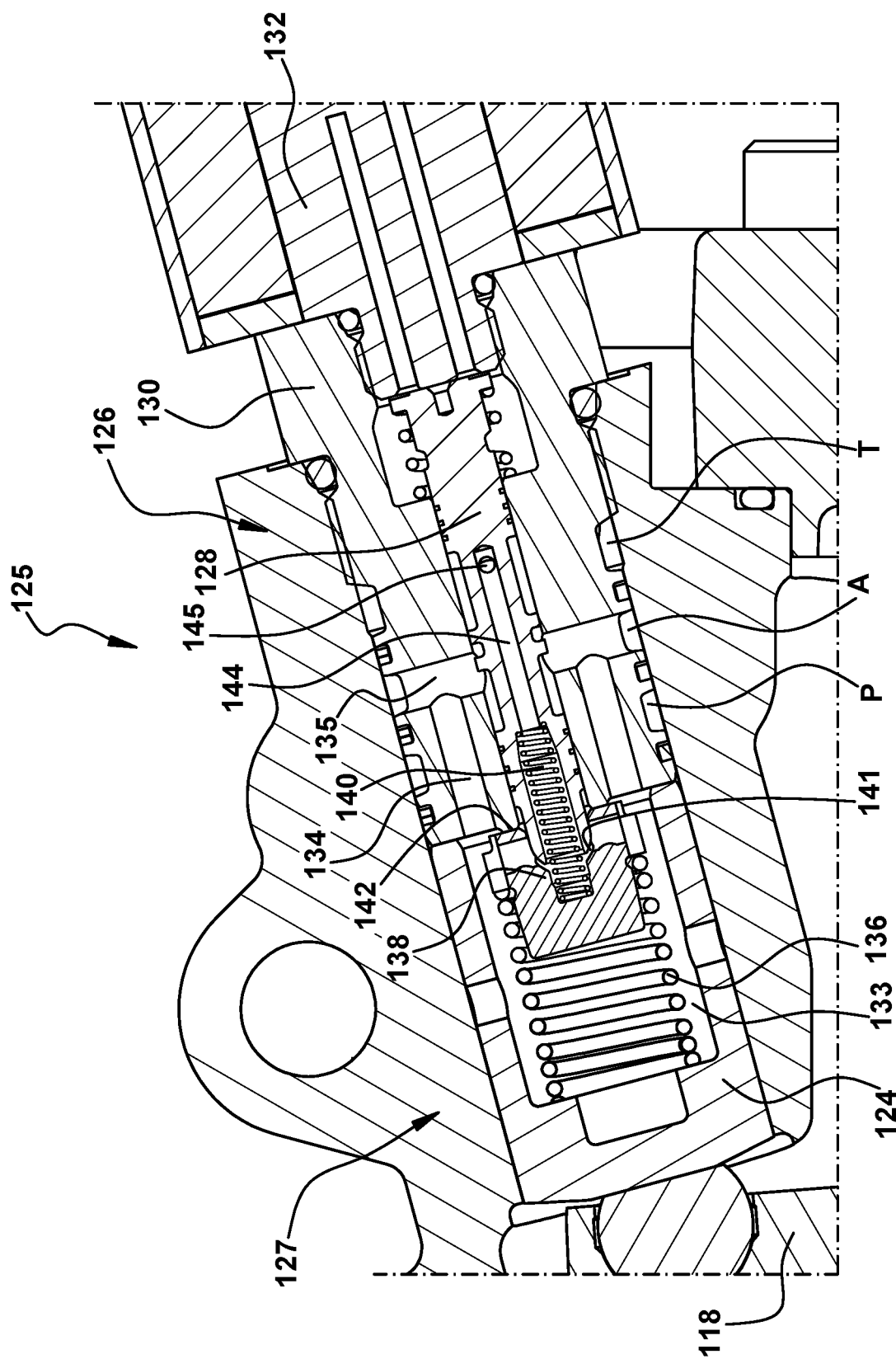
FIG. 19 is a cross-sectional side view of another embodiment of an exemplary control assembly according to the present disclosure.

Turning to FIG. 19, another exemplary embodiment of a control assembly 125, including control piston assembly 127 and control valve assembly 126 is shown in an exemplary failsafe state. The control assembly 125 is substantially similar to the above-referenced control assembly 25, and consequently the same reference numerals but indexed by 100 are used to denote structures corresponding to similar structures. In addition, the foregoing description of the control assembly 25 is equally applicable to the control assembly 125 except as understood by the description below. It is also understood that aspects of the control assemblies 25, 125 may be substituted for one another or used in conjunction with one another where applicable.

As shown in the exemplary embodiment, the control valve assembly 126 includes a spring guide 138 (second valve part) and control spool 128 (first valve part) that are configured to separate from each other, via operation of the biasing member 140, to form a gap 142 as a portion of a vent flow passage between the spring guide 138 and control spool 128. The control spool 128 includes internal flow passages that also form part of the vent flow passage, such as axial passage 144 and radial passages 145. In the illustrated failsafe state, when the solenoid 132 loses power (or current is reduced below a certain amount), the force provided by the biasing member 140 against one side of the control spool 128 is greater than the force provided by the solenoid 132 against the opposite side of the control spool 128. This allows control spool 128 to separate from the spring guide 138, thereby forming the gap 142 and opening the vent flow passage(s) (e.g., flow passages 142, 144 and 145), which allows fluid to flow from the internal chamber 133 of the control piston 124 to the drain port T.

Figure 20:
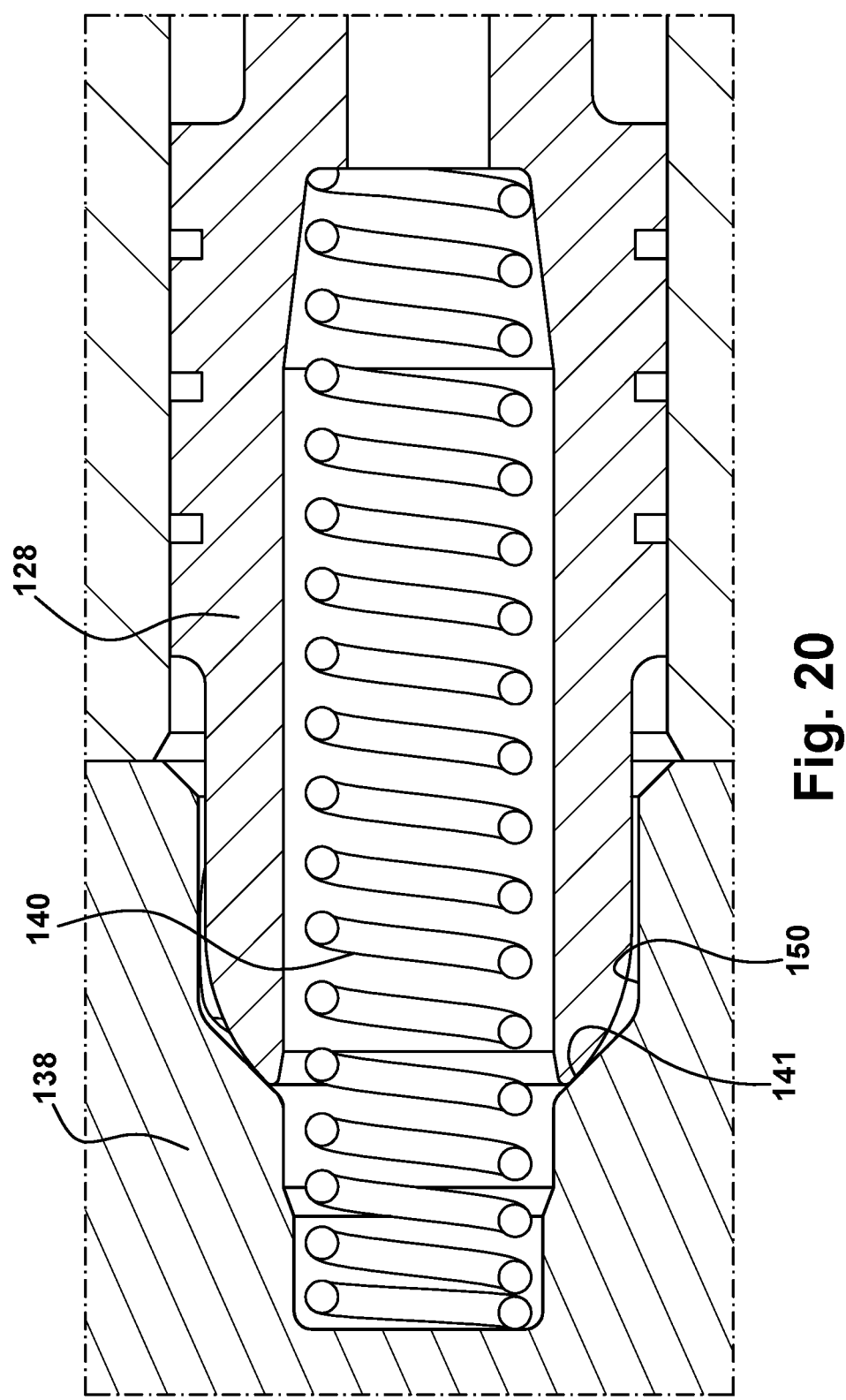
FIG. 20 is a cross-sectional side view showing an exemplary control spool interacting with an exemplary spring guide of the control assembly shown in FIG. 19.

Referring to FIG. 20, the rigid connection between the spring guide 138 and control spool 128 when in a normal operating state is shown. As show, the spring guide 138 includes a recessed portion 150, such as a relatively shallow socket, that is configured to receive an end portion of the control spool 128. The recessed portion 150 may enable centering and alignment of the control spool 128 with the spring guide 138. The engagement between the spring guide 138 and the control spool 128 also provides a rigid connect (e.g., a direct connection at the valve seat 141 in the illustrated embodiment), similarly to that described above.

Figure 21:
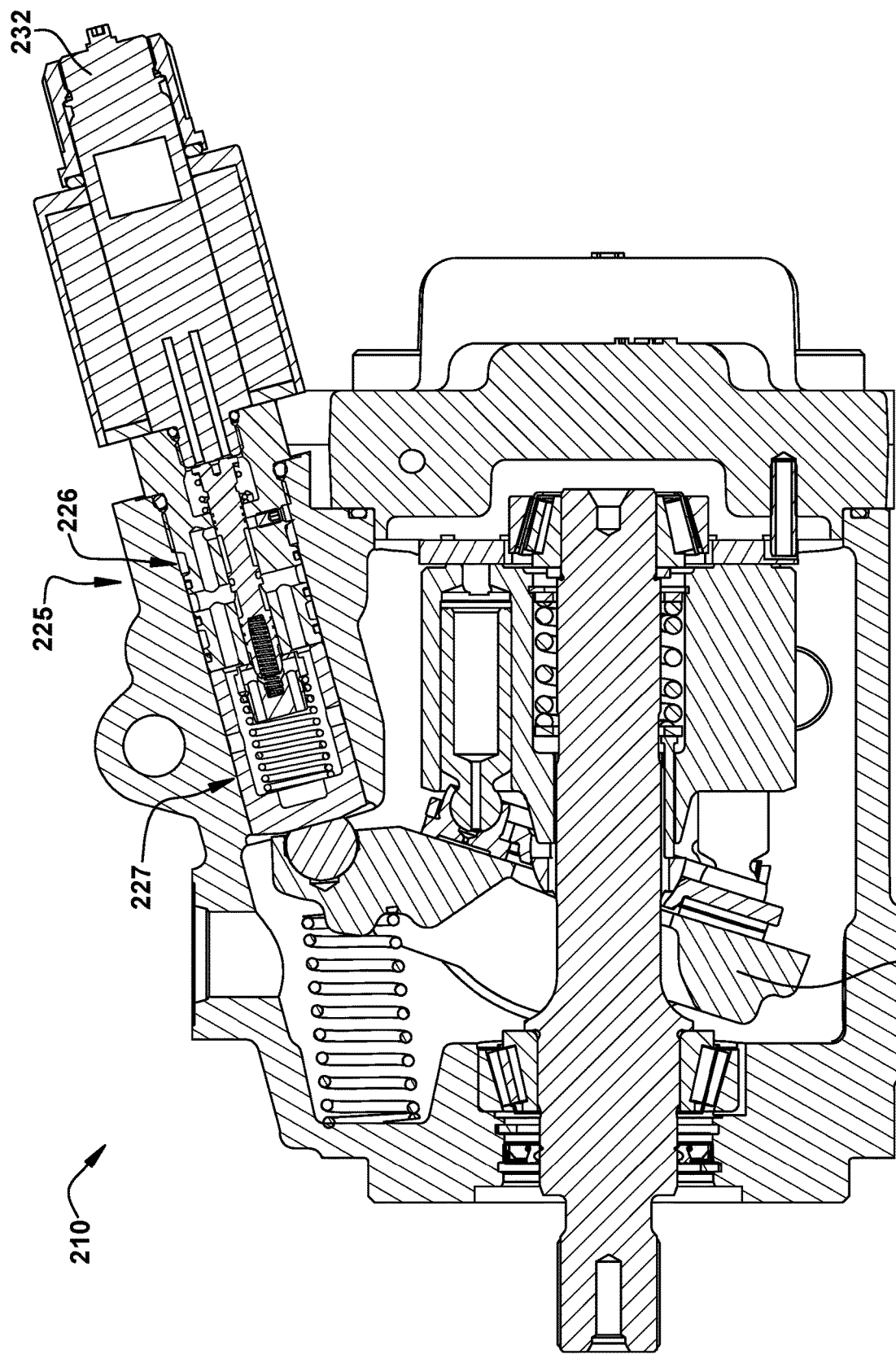
FIG. 21 is a cross-sectional side view of another embodiment of an exemplary hydraulic pump according to the present disclosure, which is shown in an exemplary failsafe state.
Figure 22:
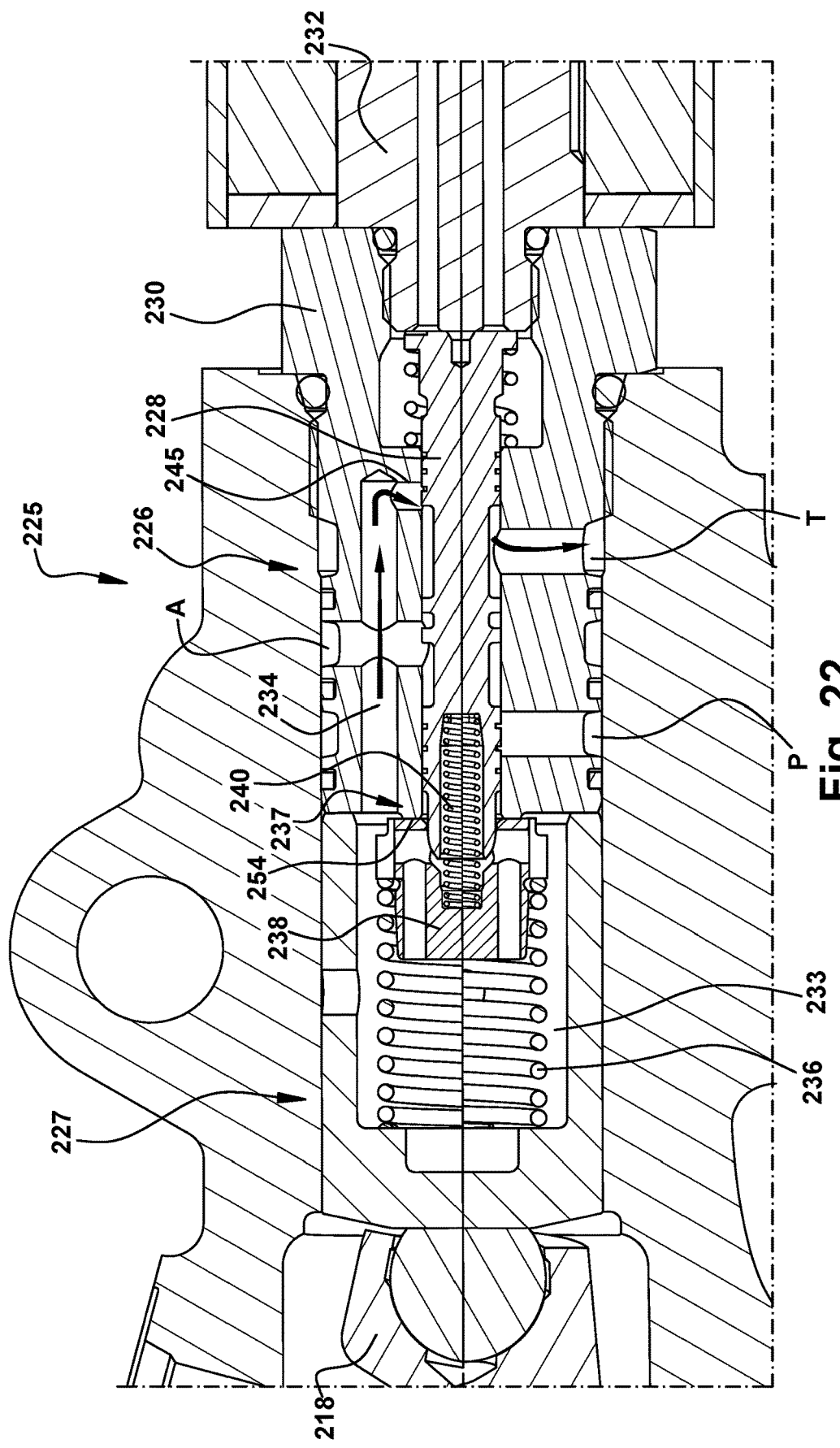
FIG. 22 is an enlarged cross-sectional quarter view taken from FIG. 21, showing a close-up view of another embodiment of an exemplary control assembly in the failsafe state.
Figure 23:
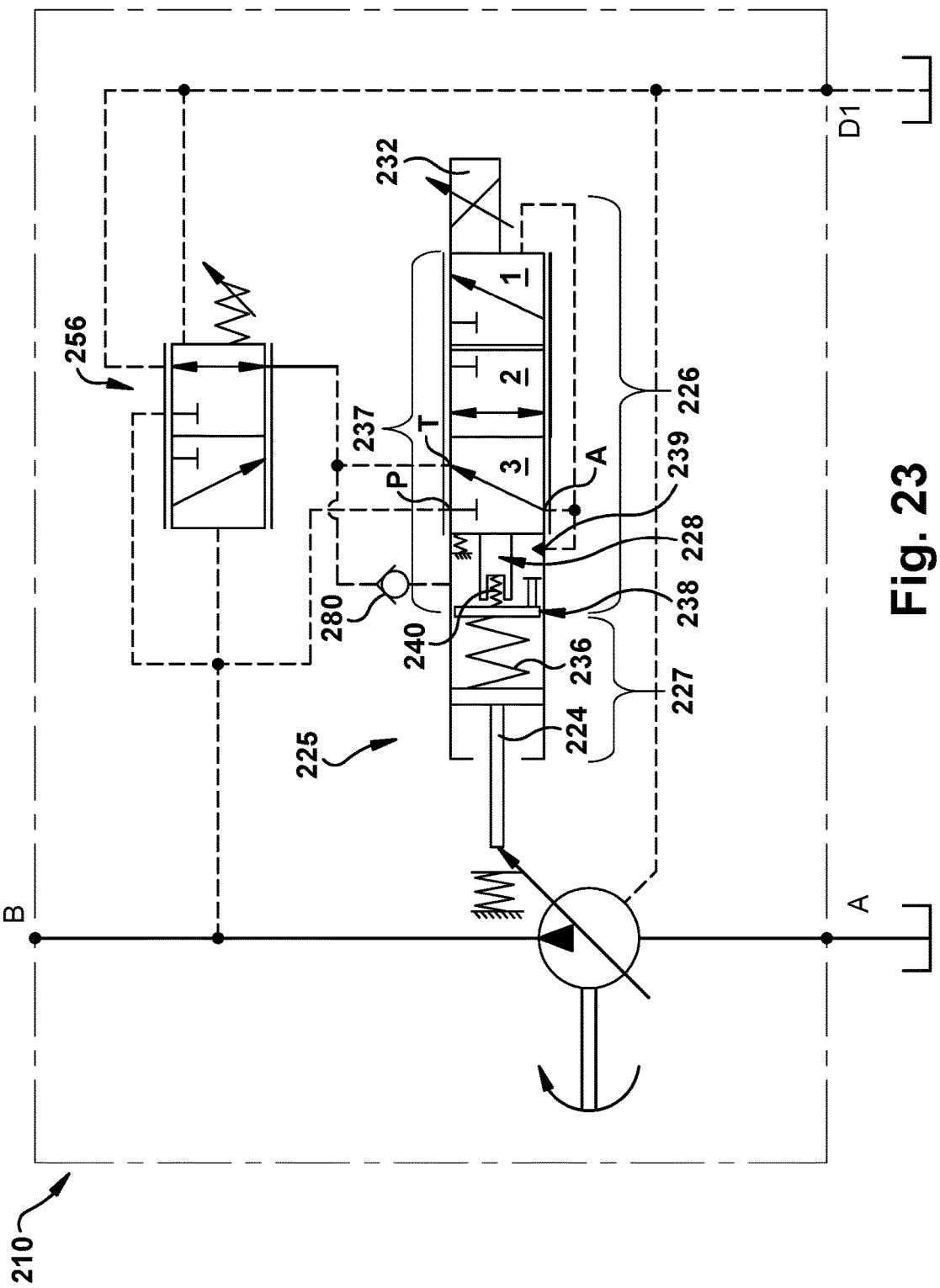
FIG. 23 is a hydraulic circuit diagram of the hydraulic pump in FIGS. 21 and 22.

Turning to FIGS. 21-23, another exemplary embodiment a hydraulic pump 210 is shown having an exemplary control assembly 225, including control piston assembly 227 and control valve assembly 226. The control assembly 225 is substantially similar to the above-referenced control assembly 25, 125 and consequently the same reference numerals but in the 200-series are used to denote structures corresponding to similar structures. In addition, the foregoing description of the control assembly 25, 125 is equally applicable to the control assembly 225 except as understood by the description below. It is also understood that aspects of the control assemblies 25, 125, 225 may be substituted for one another or used in conjunction with one another where applicable.

In the illustrated embodiment, the hydraulic pump 210 is shown in an exemplary failsafe state. As shown in the exemplary embodiment, the control valve assembly 226 includes a valve member 237 having a first valve part (e.g., control spool 228) and a second valve part (e.g., spring guide 238) that are configured to be positionable relative to each other via operation of the biasing member 240 interposed between the valve parts 228, 238.

Figure 31:
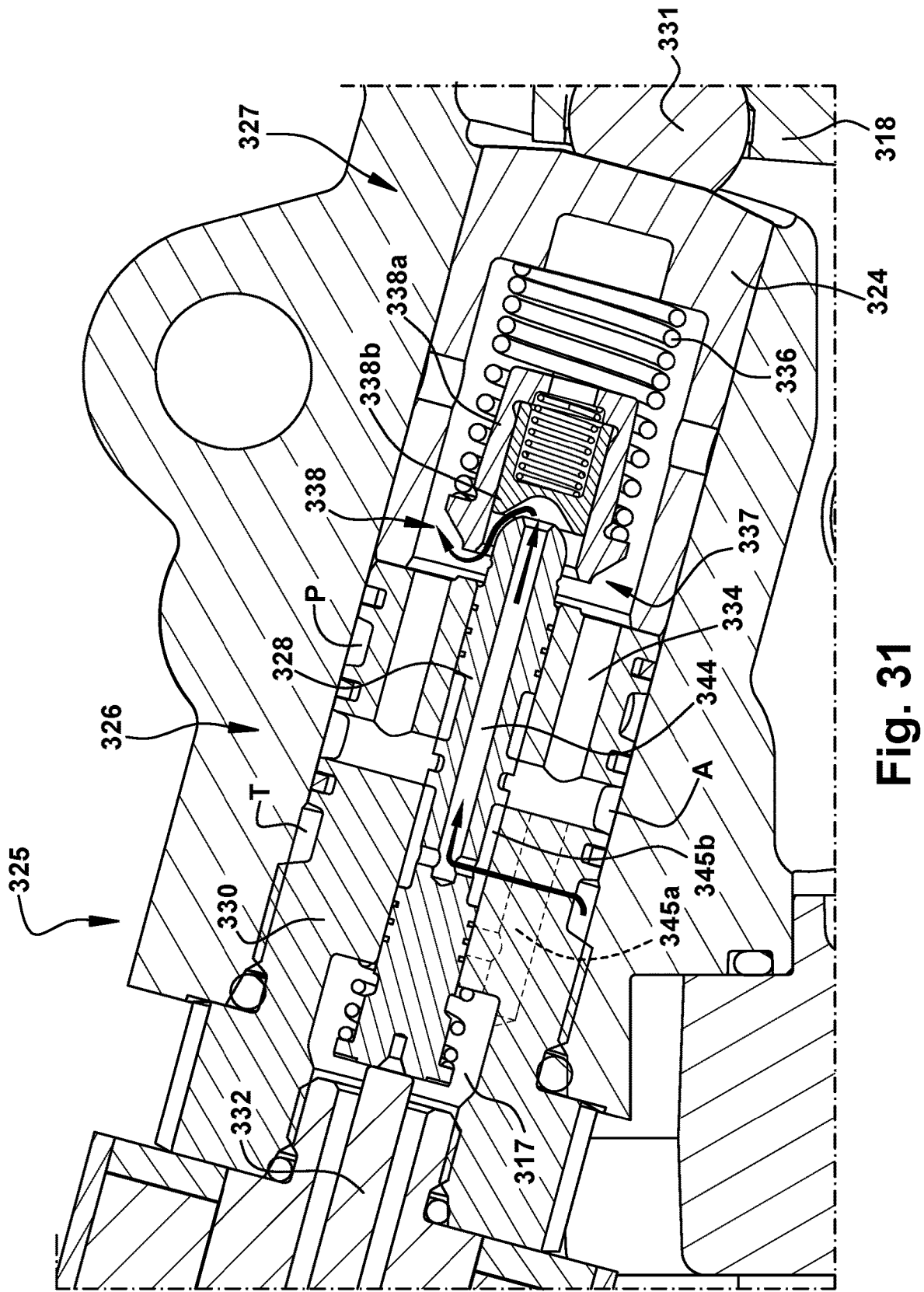
FIG. 31 is an enlarged cross-sectional view of the control assembly of FIG. 24 shown in a hydromechanical control override state.

The operation of the solenoid 232, biasing member 240, etc. is substantially similar to that described above for the different operating states of the pump. In the illustrated embodiment, however, the control spool 228 does not contain internal flow passages that form a portion of the vent flow passage 239. Instead, the vent flow passage(s) are formed in the valve body, such as in the valve sleeve 230. More particularly, in the illustrated embodiment the sleeve 230 includes a radial flow passage 245 that is in fluid communication with the axial flow passage 234 in the sleeve 230 (collectively referred to as vent flow passage 239). The axial flow passage 234 is in fluid communication with the internal chamber 233 of the control piston 224, thereby enabling fluid to flow from the control piston 224 to the drain port T via the vent flow passage 239 depending on the operating state of the pump 210. For example, when in a normal operating state of the pump 210, the biasing member 240 is configured to position the first and second valve parts 228, 238 relative to each other such that the vent flow passage is closed (e.g., radial passage 245 is closed to drain T by spool 228). On the other hand, when in a failsafe state of the pump 210, the biasing member 240 is configured to position the first and second valve parts 228, 238 relative to each other such that the vent flow passage is opened. In the illustrated failsafe state, for example, the spring guide 238 abuts the stop surface 254 and the biasing member 240 (e.g., spring) exerts a biasing force on the spool 228 that exceeds the actuating force of the solenoid 232 (e.g., due to low power or failure), thereby causing the spool 228 to move (e.g., right in the figure) to open the radial passage 245 to drain T. As shown in FIG. 23, because the spool 228 does not contain internal flow passages and an internal check valve function like that of control assembly 25, an additional check valve element 280 may be added to the circuit for pressure override functionality of the pressure compensator 256. The check valve element 280 may be utilized in a hydromechanical control override condition, which is described in further detail below with respect to FIG. 31 showing another exemplary embodiment of a control assembly.

Turning to FIGS. 24-31, another exemplary embodiment a control assembly 325 for a hydraulic pump is shown. The control assembly 325 is substantially similar to the above-referenced control assembly 25, 125, 225 and consequently the same reference numerals but in the 300-series are used to denote structures corresponding to similar structures. In addition, the foregoing description of the control assembly 25, 125, 225 is equally applicable to the control assembly 325 except as understood by the description below. It is also understood that aspects of the control assemblies 25, 125, 225, 325 may be substituted for one another or used in conjunction with one another where applicable. The control assembly 325 may be used with pump 10, 110, 210, 310.

As shown in the exemplary embodiment, the control assembly 325 includes control piston assembly 327 and control valve assembly 326. The control piston assembly 327 generally includes control piston 324 and feedback spring 336. The internal cavity of the control piston 324 forms a fluid chamber that is in fluid communication with the control valve assembly 326 to enable the control piston 324 to move within the bore and thereby control the displacement angle of the swashplate 318, such as via ball-and-socket joint 331.

The control valve assembly 326 generally includes a control valve member 337 movable in a fluid flow path of a valve body 330, and an actuator 332 that actuates movement of the valve member 337. In exemplary embodiments, the control valve member 337 may include first and second valve parts (or portions) having one or more portions that cooperate with each other and/or are movable relative to each other in certain operating states of the pump 310 (FIG. 30), as described in further detail below. In the illustrated embodiment, for example, the first valve part of the control valve member 337 is a movable control spool 328, and the valve body 330 is a control sleeve 330 that defines an internal bore for movement of the control spool 328. Also shown in the illustrated embodiment, for example, the second valve part of the valve member 337 includes a cap which forms at least part of a spring guide 338 having one or more portions or parts that interface with a nose portion of the spool 328. As shown, the spring guide 338 is operably coupled to the feedback spring 336 on one side of the spring guide 338, and also is operably coupled to the control spool 328. In the illustrated embodiment, the actuator 332 that actuates the control spool 328 is a solenoid 332 that may be directly coupled to the control spool 328.

The control assembly 325 employs a mechanical feedback mechanism to precisely control the positioning of the control piston 324. In the illustrated embodiment, the feedback control is achieved by the positioning of the control spool 328, which controls the flow of fluid through porting to achieve a resultant fluid pressure associated with the positioning of the swashplate 318. The porting includes a supply port P (also referred to as pressure port P) in fluid communication with a supply of fluid, a control port A that can provide a flow path of fluid to and from the control piston 324 (such as via internal fluid passages 334 in the sleeve 330), and a drain port T that can provide a drain of the fluid to a tank or comparable low case pressure component. The control spool 328 may include an internal fluid passage 344 to enable connection with the ports.

Figure 24:
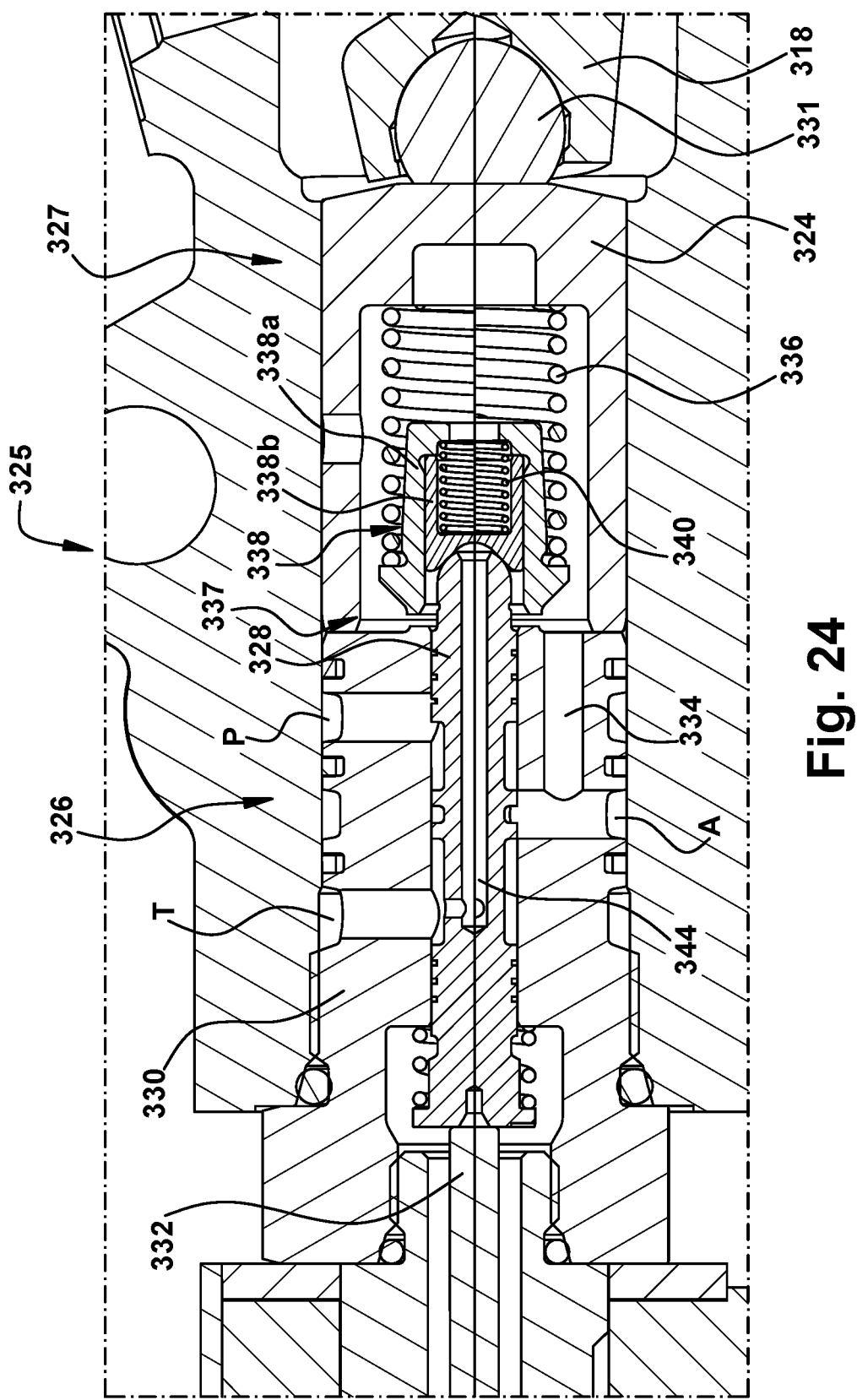
FIG. 24 is an enlarged cross-sectional view of an exemplary control assembly according to another embodiment shown in a normal operating state at maximum displacement.

Referring particularly to FIGS. 24, a normal operating state (metering) at maximum displacement is shown. In the illustrated state, a user (or automated control mechanism) initiates a control signal to energize the solenoid 332 to achieve positioning of the control piston 324 to cause a corresponding resultant displacement of the swashplate 318 as desired for a particular flow of hydraulic fluid through the pump 310. As the solenoid 332 current is increased, the force on the control spool 328 increases thereby urging the control spool 328 to the first position (e.g., to the right in the figures). This causes the control spool 328 to block the connection from the supply port P to the control port A, and the control port A is instead connected to the drain port T. The control spool 328 will meter the fluid flow from the control port A to the drain port T, thereby venting the fluid from the control piston 324. This allows the control piston 324 to move (e.g., left in the figures) to increase the swashplate 318 angle. The feedback spring 336 follows the swashplate 318 via the control piston 324, and this feedback spring 336 transmits its force to the control spool 328 via the spring guide 338. When the swashplate angle increases such that the force provided by the feedback spring 336 equals the force provided by the solenoid 332, the control valve assembly 326 closes (control spool 328 blocks ports P and T, as shown in FIG. 24) to maintain the desired swashplate angle.

Figure 25:
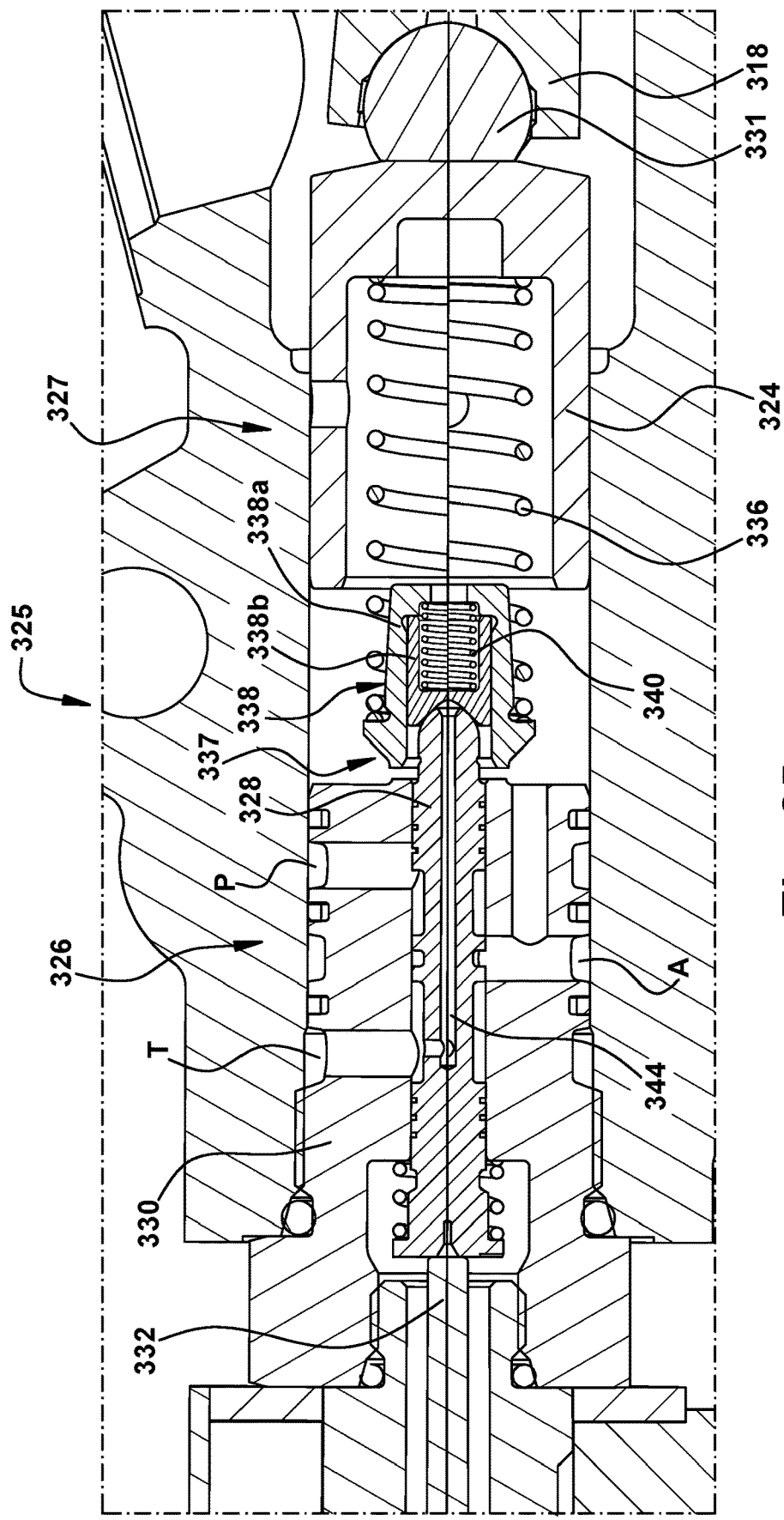
FIG. 25 is an enlarged cross-sectional view of the control assembly of FIG. 24 shown in a normal operating state at minimum displacement.

Conversely, referring to FIGS. 25, a normal operating state (metering) at minimum displacement is shown. In the state illustrated in FIG. 25, when the solenoid 332 current is decreased, the force on the control spool 328 decreases thereby urging the control spool 328 to its second position (e.g., to the left in the figures). This causes the control spool 328 to block the drain port T and connects the supply port P with the control port A. The control spool 328 will begin metering flow from the pressurized supply port P to the control port A. This porting state with P-A in fluid communication feeds flow of fluid to the control piston 324 until the control piston 324 moves sufficiently (e.g., to the right in the figures) to reduce the angle of swashplate 318. When the swashplate angle reaches its commanded position, the force from the feedback spring 336 will equal the force from the solenoid 332, and the control valve 326 will close (control spool 328 block ports P and T, as shown in the illustration) to maintain the commanded swashplate position.

Referring to FIGS. 26A and 26B, an exemplary failsafe state of the control assembly 325 is shown, in which the swashplate 318 is controlled to be at maximum displacement. This failsafe state prevents loss of hydraulic power in the event of an electrical failure. To achieve the failsafe state in the exemplary embodiment, the control valve assembly 326 includes a biasing member 340 interposed between respective portions of the first valve part (e.g., spool 328) and the second valve part (e.g., spring guide 338). More particularly, the exemplary control assembly 325 separates the spring guide 338 into two parts, including a main body 338*a* and an intermediate part 338*b*, with the biasing member 340, such as a spring, interposed between the two parts 338a, 338b. As shown, the intermediate part 338b is slidably movable within a chamber of the main body 338a, and includes a recess for receiving one end of the biasing member 340, with the opposite end of the biasing member 340 engaging an end wall of the main body 338a. The control spool 328 is operably engaged (e.g., directly and rigidly engaged) with the intermediate part 338b opposite the biasing member 340 on an outer side of the intermediate part 338b. This is different than the control assembly 25 described above in which the biasing member 40 is in direct engagement with both the control spool 28 and spring guide 38 without an intermediate part 338b.

As is apparent in the illustrated embodiment, the control assembly 325 having the biasing member 340 operably coupled to the first valve part (e.g., spool 328) and second valve part (e.g., intermediate part 338b of spring guide 338) enables the biasing member 340 to selectively position one or more portions of the first valve part (e.g., nose portion of spool 328) and one or more portions of the second valve part (e.g., intermediate part 338b of spring guide 338) relative to each other to open or close a vent flow passage in response to an operating state of the pump. For example, in the failsafe state shown in FIGS. 26A and 26B, the biasing member 340 is configured to move the control spool 328 relative to the spring guide 338 via the intermediate part 338b (also referred to as movable/intermediate force transfer member 338b) to open one or more vent flow passages (e.g., passages 345a, 345b in the valve sleeve 330) that fluidly connect the internal fluid chamber of the control piston 324 to the drain port T, thereby venting the fluid from the control piston 324. In the illustrated embodiment, the opening of the flow path between the vent passage 345b to the drain port T is made by the land of the control spool 328 moving (e.g., left in the figures) to clear the opening of the vent passage 345b. As fluid is vented from the chamber of the control piston 324 (shown with flow arrows), this allows the control piston 324 to move (e.g., left in the figures) to increase the swashplate 318 angle to maximum displacement, such that the control piston 324 engages the sleeve 330, for example.

Similarly to the control assembly 25, the biasing member 340 of control assembly 325 provides at least some of the force (or all of the force in the illustrated embodiment) that is needed to move the control spool 328 to the failsafe position, except this movement is accomplished via movement of the intermediate force transfer member 328b in the control assembly 325. Also similarly to the control assembly 25, in the failsafe state the control assembly 325 closes the P-A fluid flow path when opening the vent path 345a, 345b from the chamber of piston 324 to drain passage, T. In the failsafe state, the control assembly 325 opens the A-T fluid flow path when opening the vent path 345a, 345b from chamber of piston 324 to drain passage, T. Generally, the force provided by the biasing member 340 is set less than the force from the solenoid 332 at its minimum control current (e.g., <400 mA). This helps to ensure that the total biasing force by the biasing member 340 on the control spool 328 does not exceed the solenoid force during normal operating conditions (e.g., >400 mA, including transient conditions), thereby eliminating overshooting to failsafe.

As shown, the main body 338a of the spring guide 338 is configured to stop on the valve sleeve 330, similarly to the control assembly 25 described above, which helps prevent overshooting to failsafe. A difference with the control assembly 325 shown in FIGS. 26A and 26B, however, is that the control spool 328 and movable force transfer member 338b remain in contact in the failsafe state. When current is removed from the solenoid 332 (or current is reduced below a certain amount) as in a failure condition, the main body 338a of the spring guide 338 will stop against the sleeve 330, and then the biasing member 340 pushes the movable force transfer member 338b and control spool 328 (relative to the main body 338a) until the spool 328 stops against the solenoid 332. At this state, vent passage 345b through the sleeve 330 is opened by the position of the spool 328 relative to the sleeve 330 to vent the internal chamber of control piston 324, thereby causing the pump 310 to default to maximum displacement. This is different from the control assembly 25, where a part of the vent passage 42 is formed between the control spool 28 and the spring guide 38 when separated from each other in the failsafe state. Nevertheless, the control assembly 325 will provide the same or similar performance benefits as shown in FIGS. 14-18.

Similarly to the control assembly 25, the control assembly 325 communicates fluid pressure to opposite sides of the control spool 328 to provide pressure balancing on both sides of the spool 328. In the illustrated embodiment, fluid passage 345a fluidly connects the chamber of control piston 324 to chamber 317 at one end portion of the spool 328, and a fluid passage 365 (FIG. 27) in the main body part 338a communicates fluid pressure to an opposite end of the spool 328 via the intermediate force transfer member 338b. However, in exemplary embodiments, the exemplary control assembly 325 may improve pressure balancing on the opposite sides of the control spool 328 compared to the control assembly 25 by utilizing the intermediate force transfer member 338b.

Figure 28A:
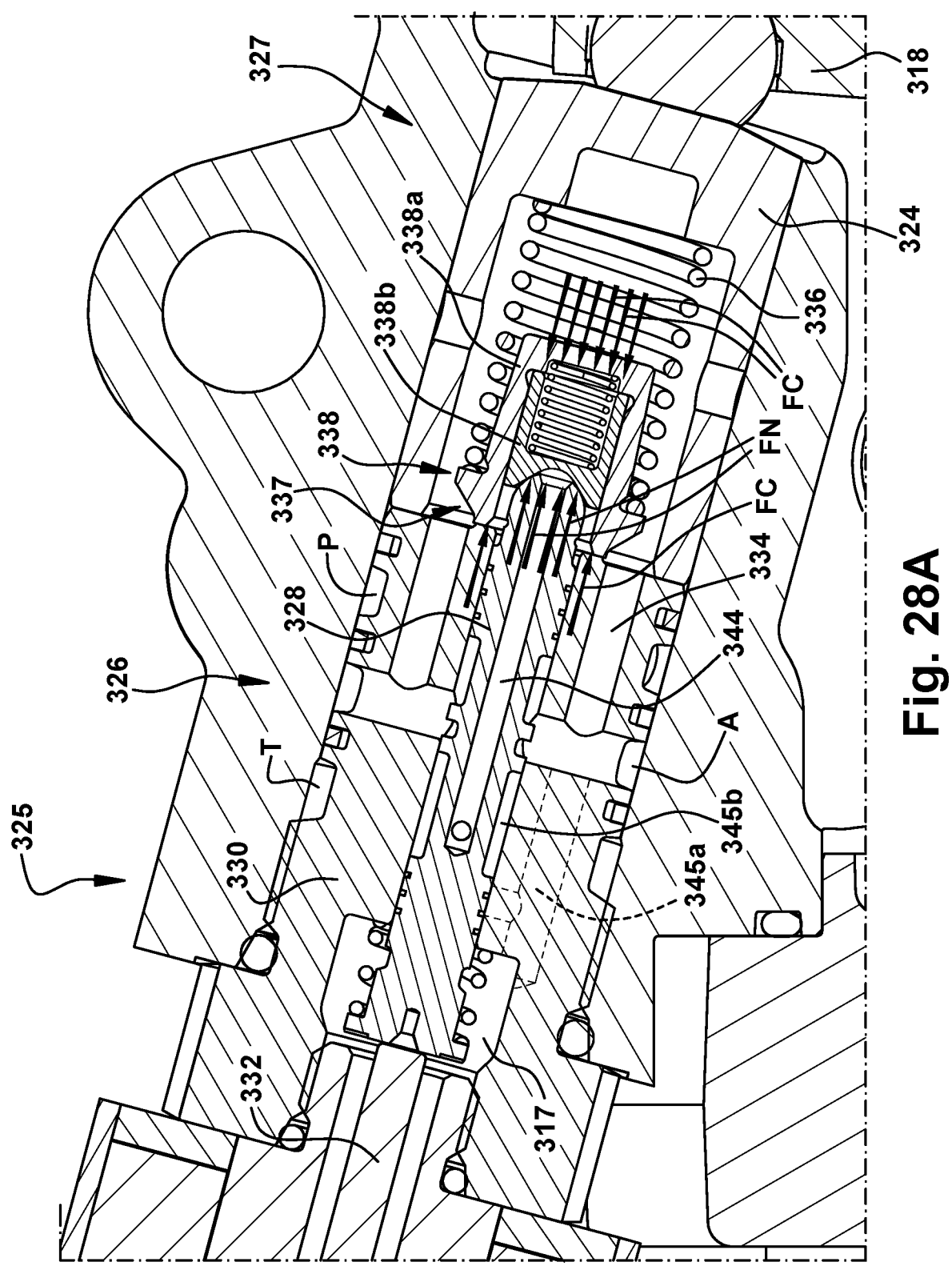
FIG. 28A is an enlarged cross-sectional view of the control assembly in FIG. 24 showing forces on the control valve in an exemplary off-stroke transient state at maximum displacement.

For example, turning briefly to FIG. 28A, an exemplary force diagram is shown overlayed on a cross-sectional view of the control assembly in an exemplary off-stroke transient state at maximum displacement (described in further detail below). In the illustrated state, the dashed arrows FN depict normal case pressure (e.g., low pressure) via connection of passage 344 to drain passage T, and the solid arrows depict control pressure FC acting on the control spool 328 and the intermediate part 338b. The net force on the control spool 328 plus the intermediate part 338b caused by fluid pressure is zero because the parts are pressure balanced. This enables the biasing member 340 to easily push the intermediate part 338b plus the control spool 328 away from the main body portion 338a, and against the solenoid 332 when solenoid force is sufficiently low. The pressure inside the spool 328 via internal passage 344 (as denoted by the dashed arrows FN that extend all the way to the conical sealing interface between the spool 328 and intermediate part 338b) does not have enough force to separate the main body part 338a from the spool 328, unless a hydromechanical control activates and supplies pressurized flow through port T and passage 344, as described below. In this manner, the forward end portion of the spool 328 and the engagement seat of the intermediate part 338b act as a non-return (check) valve.

Figure 27:
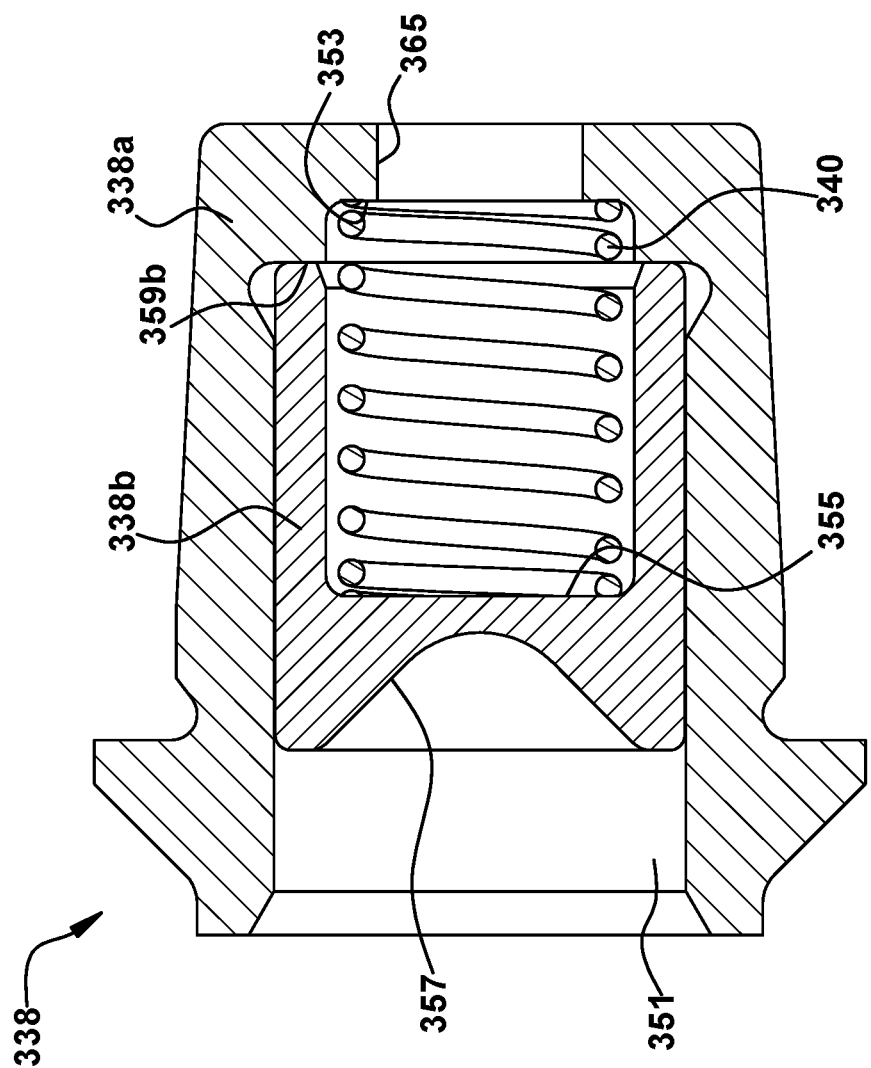
FIG. 27 is a cross-sectional view of an exemplary guide of the control assembly of FIG. 24, which is shown in isolation.

FIG. 27 shows a close-up view of the exemplary guide sleeve 338 in isolation, including the main body part 338a, the intermediate force transfer member 338b movable within an internal chamber 351 of the main body part 338a, and the biasing member 340 between the parts 338a and 338b. One end of the biasing member 340 is engaged with an end wall 353 of the main body part 338a and an opposite end of the biasing member 340 is engaged with a recessed wall 355 of the intermediate part 338b. As discussed above, fluid passage 365 is provided in the main body part 338a to communicate fluid pressure to an end of the control spool 328 via the internal chamber 351 and intermediate part 338b. The intermediate part 338b includes a recessed surface 357 in the form of a conical seat, which is configured to rigidly and sealingly engage with the forward end of the control spool 328. As shown, the main body part 338*a* may include suitable stop(s) 359*b* to limit movement of the intermediate part 338*b*. In the illustrated embodiment, at least one of the stops 359*b* is formed as a wall of the main body portion 338*a* and provides a rigid connection with the intermediate part 338*b* during normal operation.

Figure 28B:
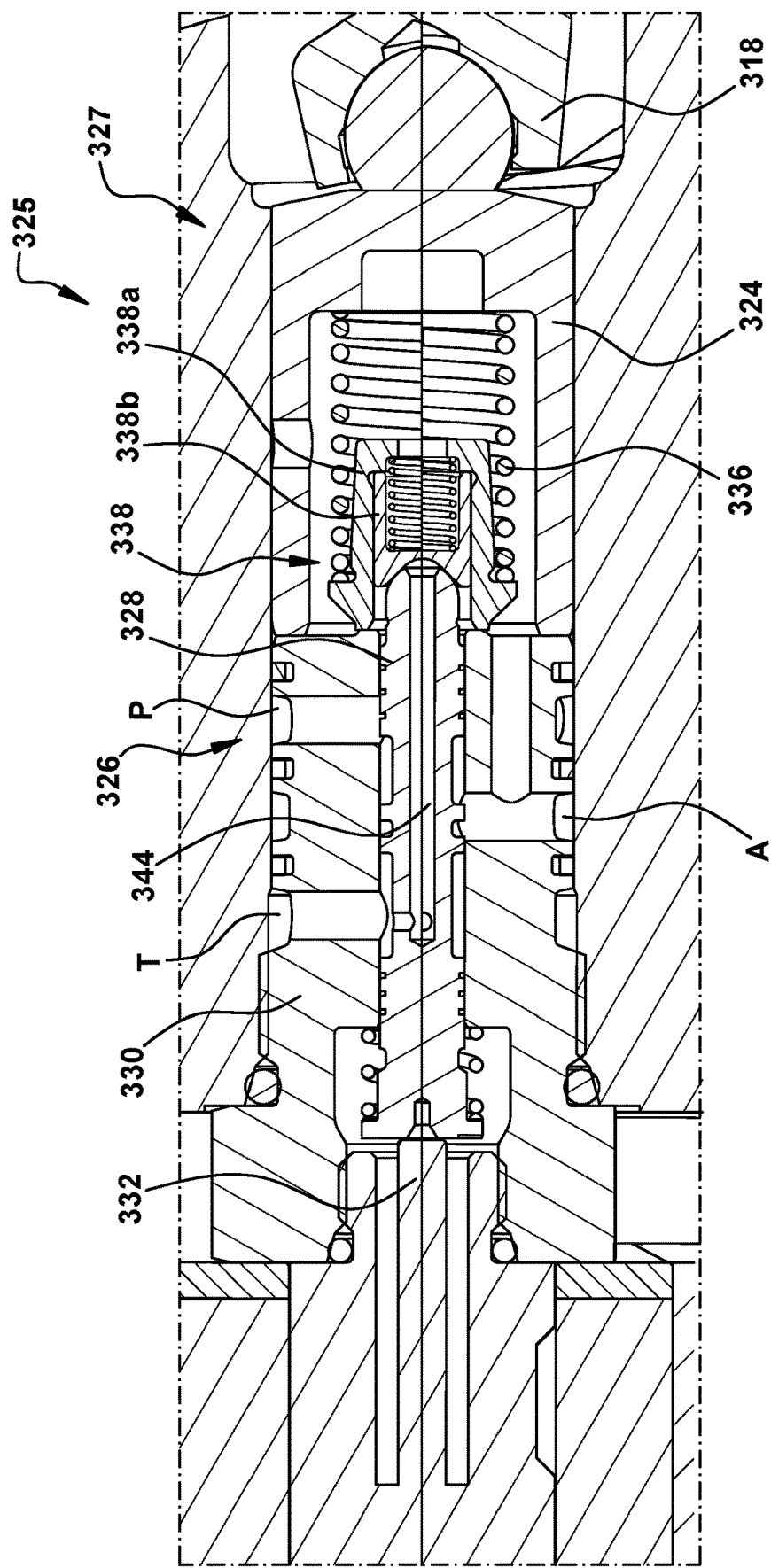
FIG. 28B is another enlarged cross-sectional view of the control assembly of FIG. 24 shown in the off-stroke transient state at maximum displacement.

Turning to FIG. 28, an exemplary off-stroke transient state is shown at maximum displacement of the swashplate 318. In such a transient state, the forces between the feedback spring 336 and the solenoid 332 may be out of balance, such that the force provided by the feedback spring 336 is greater than the force provided by the solenoid 332. This causes the control spool 328 to move (e.g., left in the figure) and open the flow path from the pressure port P to the control port A. As shown in the illustrated embodiment, the configuration of the control assembly 325 limits the travel of the feedback spring 336 by stopping the spring guide 338 on a stop surface of the control sleeve 330. In this manner, the control assembly 325 will not over-shoot to the failsafe state during this transient condition, since the feedback spring 336 force does not push on the control spool 328 due to the spring guide 338 being physically stopped at the stop surface of the sleeve 330. Also in the illustrated embodiment, the biasing force (e.g., spring force) provided by the biasing member 340 is lower than the solenoid 332 force at minimum command (e.g., 400 mA) so that the control spool 328 does not separate from the intermediate force transfer member 338*b*, and the intermediate member 338*b* does not unseat from its engagement surface (stop surface 359*b*) of the main body part 338*a*. This prevents the control spool 328 from shifting to the failsafe position and opening vent passage(s) 345*a*, 345*b*.

Figure 29:
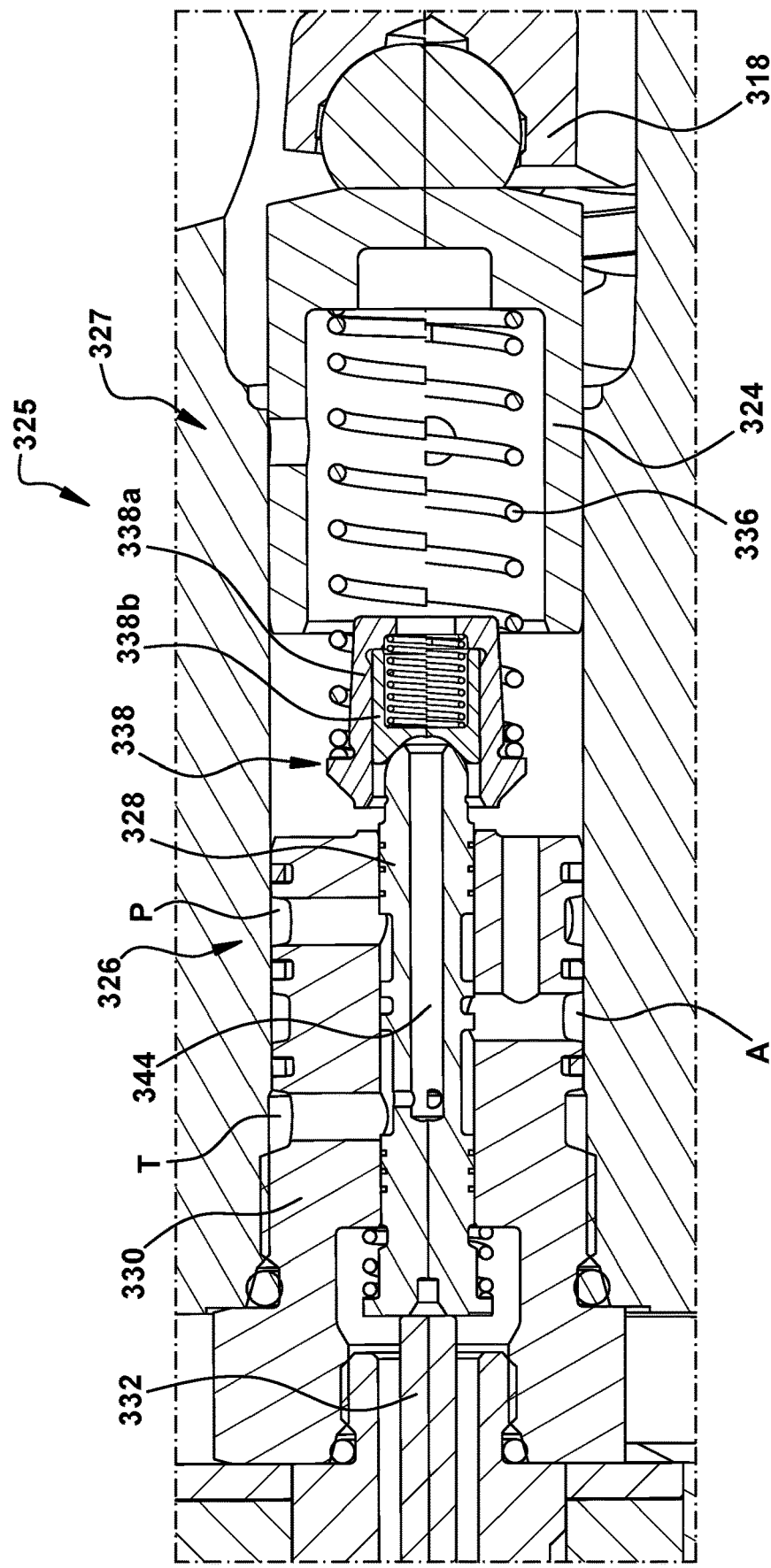
FIG. 29 is an enlarged cross-sectional view of the control assembly of FIG. 24 shown in an off-stroke transient state at minimum displacement.

Referring to FIG. 29, an exemplary on-stroke transient condition is shown at minimum displacement of the swashplate 318. In such a transient state, the forces between the feedback spring 336 and the solenoid 332 are out of balance, and the control spool 328 is moved (e.g., right in the figure) to open the flow path from the control port A to the drain port T. Because the force provided by the biasing member 340 on the control spool 328 is set less than the force provided by the solenoid 332 at the minimum control current (e.g., <400 mA), the spring guide 338 and control spool 328 remain in rigid contact via rigid surfaces (e.g., without effect of the resilient biasing member 340) to provide improved feedback function.

Figure 30:
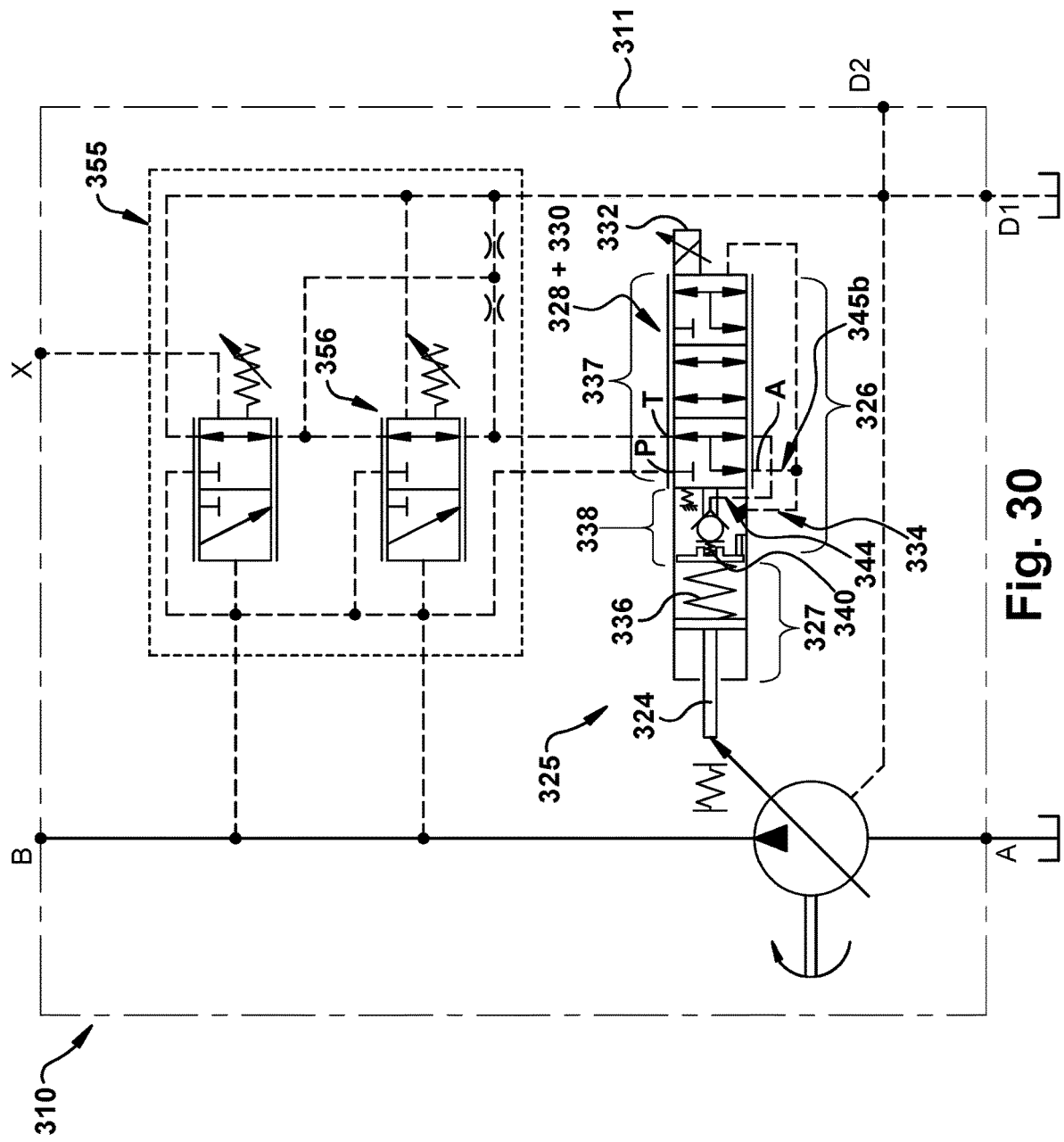
FIG. 30 is a hydraulic circuit diagram of an exemplary system employing the control assembly of FIG. 24 according to an embodiment.

Referring to FIG. 30, an exemplary fluid circuit diagram of the exemplary system including pump 310 and control assembly 325 is shown. In the illustrated circuit, the respective parts of the system described above are shown with the same reference numbers. The operation of the system is apparent in view of the illustrated circuit in combination with the description above.

Turning to FIG. 31, with reference also to the fluid circuit diagram of FIG. 30, an exemplary hydromechanical control 355 will now be described in further detail. As shown, the hydromechanical control 355 may include a pressure limiter valve 356 that is configured to preset an activation pressure with a limiter spring. When a hydromechanical override state is triggered and pressure on the limiter spool exceeds the set pressure and activates the limiter valve 356, fluid will flow in reverse through the drain passage T and into the internal passage 344 of the control spool 328, as shown with the flow lines in FIG. 31. In the illustrated state, the pressure in the internal passage 344 exerted against the intermediate part 338*b* causes the biasing member 340 to compress and unseats the forward end of the spool 328 from the conical interface 357, thereby allowing pressure to vent to the chamber of the control piston 324 to provide override functionality. As shown in the fluid circuit diagram of FIG. 30, the intermediate part 338*b* of the spring guide 338 may thus form an internal non-return valve portion of the valve assembly having check valve functionality.

Exemplary forms of a control mechanism and/or hydraulic pump have been disclosed herein that improve upon one or more deficiencies of conventional control mechanisms such as EDCs.

According to an aspect, a unique displacement control assembly is provided for a hydraulic pump that is particularly suitable for providing mechanical feedback control of the positioning of a control actuator that controls displacement of the pump via a movable displacement control member that interacts with a rotating piston group of the pump.

According to an aspect of the present disclosure, the displacement control assembly includes a control valve member that is movable within a fluid flow path of the control assembly to control a flow of fluid to or from the control actuator, such as a control piston or the like, which controls the position of the displacement control member, such as a swashplate or the like. The control valve member includes a first valve part, such as a control spool, and a second valve part, such as cap or spring guide which may include one or more portions that interface with a nose portion of the spool. The relative position of one or more portions of the first valve part and one or more portions of the second valve part may be adjustable depending on an operating state of the pump. For example, one or more portions of the first valve part and/or the second valve part may be movable along an axis and/or movable relative to each other depending on the operating state of the pump. The control assembly further includes a biasing member, such as a spring, which may be operably coupled to the first and/or second valve parts, in which the biasing member is configured to selectively position the first and second valve parts to open or close a vent flow passage for venting fluid from the control actuator in response to the operating state of the pump. In a normal operating state of the pump, the biasing member is configured to position the first and second valve parts such that the vent flow passage is closed, and the control valve member is movable in the fluid flow path to control the flow of fluid to or from the control actuator. In a failsafe state of the pump, the biasing member is configured to position the first and second valve parts such that the vent flow passage is opened, thereby enabling fluid from the control actuator to escape via the vent flow passage, which may enable the displacement control member to move to a maximum displacement position.

According to an aspect of the present disclosure, the control assembly may further include a valve actuator operably coupled to the valve member, in which the valve actuator is configured to actuate the valve member. The valve actuator may exert an actuation force in a first direction against one side of the first valve part of the valve member, and the biasing member may exert a biasing force in a second opposite direction against an opposite side of the first valve part. In the normal operating state, the actuation force on the first valve part may be greater than the biasing force, such that the first and second valve parts are positioned to close the vent flow passage. In the failsafe state, the actuating force on the first valve part may be less than biasing force, such that the first and second valve parts are positioned to open the vent flow passage.

According to one aspect of the present disclosure, a hydraulic pump includes: a piston rotating group comprising a plurality of reciprocating pistons configured to displace a volume of hydraulic fluid from the pump; a movable displacement control member that is configured to move within a displacement range to interact with the pistons and vary the displacement of the pump; a control actuator configured to interact with the movable displacement control member to control the position of the displacement control member within the displacement range; and a displacement control valve assembly configured to provide mechanical feedback control of positioning of the control actuator and thereby the displacement control member; wherein the displacement control valve assembly includes a control valve member that is movable within a fluid flow path of the control valve assembly to control a flow of fluid to or from the control actuator, the control valve assembly including a first valve part, a second valve part, and a biasing member configured to selectively position the one or more portions of the first valve part and one or more portions of the second valve part relative to each other to open or close a vent flow passage in response to an operating state of the pump; wherein in a normal operating state of the pump, the biasing member is configured to position the one or more portions of the first valve part and the one or more portions of the second valve part relative to each other such that the vent flow passage is closed, and the control valve member is movable in the fluid flow path to control the flow of fluid to or from the control actuator; and wherein in a failsafe state of the pump, the biasing member is configured to position the one or more portions of the first valve part and the one or more portions of the second valve part relative to each other such that the vent flow passage is opened, thereby enabling fluid from the control actuator to escape via the vent flow passage.

Embodiment(s) may include one or more features of the foregoing aspects, separately or in any suitable combination, which may be combined with one or more of the following additional features, which may be included separately or in any suitable combination.

In some embodiments, the first valve part of the valve member is a valve spool, the second valve part of the valve member is a cap or spring guide that interfaces with a nose portion of the valve spool, and the vent flow passage includes one or more internal fluid flow passages of the valve spool and/or the cap or spring guide.

In some embodiments, the cap or spring guide is configured as a non-return member or check valve member.

In some embodiments, the first valve part and second valve part are discrete separable parts.

In some embodiments, the second valve part is configured as a spring guide that is operably coupled to a feedback spring on one side of the feedback spring, the feedback spring being operably coupled to the control actuator on an opposite side of the feedback spring.

In some embodiments, the control actuator is a control piston having an internal fluid chamber, wherein the control piston contains at least a portion of the feedback spring.

In some embodiments, the biasing member includes a biasing spring.

In some embodiments, in the normal operating state, the biasing spring is compressed such that the first and second valve parts sealingly engage with each other to close the vent flow passage.

In some embodiments, in the failsafe state, the biasing spring is extended such that the first and second valve parts are positioned relative to each other to open the vent flow passage.

In some embodiments, the vent flow passage is formed by one or more internal flow passages in the first valve part and/or the second valve part.

In some embodiments, one of the first valve part or the second valve part includes a valve seat in the vent flow passage, and the other one of the first valve part or the second valve part includes a valve surface for engaging or disengaging the valve seat to thereby close or open the vent flow passage.

In some embodiments, in the normal operating state, the biasing member is configured to position the first and second valve parts relative to each other such that the valve surface sealingly engages the valve seat to close the vent flow passage.

In some embodiments, in the failsafe state, the biasing member is configured to position the first and second valve parts relative to each other such that the valve surface is spaced apart from the valve seat to open the vent flow passage.

In some embodiments, the first valve part is movable within a valve body having one or more flow passages that form at least a portion of the fluid flow path of the control valve assembly.

In some embodiments, the vent flow passage is formed by at least one of the flow passages in the valve body.

In some embodiments, in the normal operating state, the biasing member is configured to position the first and second valve parts relative to each other such that the first valve part cooperates with the valve body to close the vent flow passage.

In some embodiments, in the failsafe state, the biasing member is configured to position the first and second valve parts relative to each other such that the first valve part cooperates with the valve body to open the vent flow passage.

In some embodiments, the control valve assembly includes a valve actuator operably coupled to the valve member, the valve actuator being configured to actuate the valve member.

In some embodiments, the valve actuator includes a solenoid.

In some embodiments, the biasing member and the valve actuator provide opposing forces on the valve member.

In some embodiments, in the normal operating state, the force on the valve member provided by the valve actuator is greater than force on the valve member provided by the biasing member.

In some embodiments, in the failsafe state, the force on the valve member provided by the valve actuator is less than force on the valve member provided by the biasing member.

In some embodiments, the first and second valve parts are discrete parts, and in the normal operating state, the first valve part and the second valve part are rigidly coupled together for common axial movement.

In some embodiments, second valve part has a recess for receiving an end portion of the first valve part, the recess being configured to align and center the first and second valve parts relative to each other.

In some embodiments, the control valve assembly includes a stop surface that restricts movement of the second valve part, such as the spring guide, beyond a predefined position, and the first valve part, such as the spool, can move beyond the predefined position.

In some embodiments, in the failsafe state, the second valve part, such as the spring guide, engages the stop surface, and the first valve part, such as the spool, move axially beyond the stop surface to allow respective portions of the first and second valve parts to separate and open the vent flow passage.

In some embodiments, the stop surface is formed by a valve sleeve that defines an internal bore in which the first valve part, such as the spool, slidably moves.

In some embodiments, the hydraulic pump is a swashplate-style axial piston pump, in which: the plurality of pistons reciprocate in respective bores, the movable displacement control member is a pivotable swashplate, and the control actuator is a linearly movable control piston or a rotary actuator.

In some embodiments, the hydraulic pump is a radial piston pump, in which: the plurality of pistons reciprocate in respective bores, the movable displacement control member is a cam ring or a shaft with an eccentric, and the control actuator is a linearly movable control piston.

In some embodiments, the hydraulic pump is an axial piston bent-axis type pump, in which: the plurality of pistons reciprocate in respective bores, the movable displacement control member is a movable yoke or movable porting faceplate, and the control actuator is a linearly movable control piston or a rotary actuator.

In some embodiments, the hydraulic pump is a variable vane pump, in which: the plurality of pistons are configured as reciprocating vanes, the movable displacement control member is a cam ring, and the control actuator is a linearly movable control piston or a rotary actuator.

In some embodiments, the displacement control valve assembly comprises: a feedback spring having a spring force that changes proportionally with the movement of the control piston; and a solenoid actuator.

In some embodiments, the first valve part is a control spool that is moveable between a first position and a second position when the pump is in the normal operating state, and is moveable to a third position when the pump is in the failsafe state.

In some embodiments, the feedback spring is operably coupled to the second valve part, the feedback spring being configured to exert the spring force against a first end of the control spool via the second valve part, and the solenoid actuator is configured to exert an actuator force against a second end of the control spool opposite the first end, the actuator force being opposite a biasing force exerted by the biasing member against the first end of the control spool.

In some embodiments, a positioning of the control spool between the first position and the second position is determined based on a balance between the spring force and the actuator force acting on the control spool.

In some embodiments, the positioning of the control spool between the first position and the second position controls a flow of hydraulic fluid to the control piston to provide the mechanical feedback control of positioning of the control piston.

In some embodiments, the control spool is in fluid communication with a supply port that is in fluid communication with a supply of hydraulic fluid, with a control port that is configured to provide a flow path of hydraulic fluid to the control piston, and with a drain port that is in fluid communication with a low case pressure, such as to tank, and with the vent flow passage configured to provide a flow path of hydraulic fluid from the control piston to the drain port.

In some embodiments, the positioning of the control spool between the first position and the second position controls a flow of hydraulic fluid among the supply port, the control port, and the drain port to control the flow of hydraulic fluid to the control piston to provide the mechanical feedback control of the positioning of the control piston when in the normal operating state.

In some embodiments, the positioning of the control spool at the third position allows the fluid to flow from the control piston to the drain port to provide the mechanical feedback control of the positioning of the control piston when in the failsafe state.

In some embodiments, the displacement control valve assembly is configured to perform the mechanical feedback control of the positioning of the control piston comprising: when the spring force of the feedback spring is greater than the actuator force of the solenoid actuator, the control spool moves in a first direction from the first position toward the second position; the control spool begins metering flow from the supply port to the control port; the supply port in fluid communication with the control port feeds flow of hydraulic fluid to the control piston until the control piston moves sufficiently to change the swashplate angle to balance the actuator force and the feedback spring force; and at a position of the control spool corresponding to the balance between the actuator force and the feedback spring force, the flow path from the supply port to the control port is shut by the control spool.

In some embodiments, the displacement control valve assembly is configured to perform the mechanical feedback control of the positioning of the control piston comprising: when the spring force of the feedback spring is less than the actuator force of the solenoid actuator, the control spool moves in a second direction from the second position toward the first position; the control spool begins metering flow from the control port to the drain port; the control port in fluid communication with the drain port connects the control piston to the low case pressure (or tank) until the control piston moves sufficiently to change the swashplate angle to balance the actuator force and the feedback spring force; and at a position of the control spool corresponding to the balance between the actuator force and the feedback spring force, the flow path from the control port to the drain port is shut by the control spool.

In some embodiments, the displacement control valve assembly is configured to perform the mechanical feedback control of the positioning of the control piston comprising: when the solenoid actuator loses power or current is reduced below a threshold level, the biasing force of the biasing member is greater than the actuator force of the solenoid actuator, and the control spool moves toward the third position; at the third position, the flow path from the supply port to the control port is shut by the control spool, and the vent flow passage from the control piston to the drain port is open via relative movement of the valve spool and spring guide.

In some embodiments, the first position corresponds to the swashplate being at a maximum displacement angle, and the moving of the control spool in the first direction results in the control piston acting to reduce the swashplate angle.

In some embodiments, the second position corresponds to the swashplate being at a minimum displacement angle, and the moving of the control spool in the second direction results in the control piston acting to increase the swashplate angle.

In some embodiments, the third position corresponds to the swashplate being at a maximum displacement angle, and the moving of the control spool away from the third position results in the control piston acting to reduce the swashplate angle.

In some embodiments, the second valve part includes a main body portion and an intermediate portion movable relative to the main body portion.

In some embodiments, the biasing member is interposed between the main body portion and the intermediate portion.

In some embodiments, the first valve part maintains engagement with the intermediate portion of the second valve part for common axial movement therewith relative to the main body portion.

In some embodiments, the intermediate portion is slidable within a bore of the main body portion, the biasing member having one end engaged within a recess of the intermediate portion and an opposite end engaged against a wall of the main body portion, and wherein the intermediate portion includes an outer recess configured to engage a forward end of the first valve part.

In some embodiments, the second valve part is configured as a guide that is operably coupled to a feedback biasing member on one side of the feedback biasing member, the feedback biasing member being operably coupled to the control actuator on an opposite side of the feedback biasing member.

In some embodiments, the control actuator is a control piston having an internal fluid chamber.

In some embodiments, in the normal operating state, the biasing member is compressed such that the intermediate portion and the main body portion are rigidly coupled together at a rigid stop interface, and the first valve part and the intermediate portion are rigidly coupled together.

In some embodiments, in the failsafe state, the biasing member is extended such that the intermediate portion is separated from the rigid stop interface of the main body portion, and the first valve part and the intermediate portion are rigidly coupled together such that extension of the biasing member positions the first valve part in the valve assembly to open the vent flow passage.

In some embodiments, in the failsafe state, the control valve assembly includes a stop surface of a valve body that restricts movement of the main body portion beyond a predefined position, and the first valve part is movable beyond the predefined position by engagement and movement with the intermediate portion by extension of the biasing member to thereby open the vent passage.

In some embodiments, the vent passage includes at least one passage extending through a valve body of the valve assembly, wherein the at least one passage opens at one end into an internal chamber of the control actuator, and opens at an opposite end into a bore supporting movement of the first valve part.

In some embodiments, the main body portion of the second valve part is configured as a guide that is operably coupled to a feedback biasing member, the feedback biasing member being operably coupled to the control actuator on an opposite side of the feedback biasing member.

In some embodiments, the control valve assembly includes a valve actuator operably coupled to the valve member, the valve actuator being configured to actuate and move the valve member.

In some embodiments, the biasing member and the valve actuator provide opposing forces on the first valve part and the intermediate portion of the second valve part.

In some embodiments, in the normal operating state, the force provided by the valve actuator is greater than force by the biasing member thereby compressing the biasing member such that the intermediate portion and main body portion are rigidly coupled together at an engagement interface.

In some embodiments, in the failsafe state, the force provided by the valve actuator is less than force provided by the biasing member thereby extending the biasing member such that the intermediate portion is separated from the engagement interface and moves the first valve part to open the vent passage.

In some embodiments, the intermediate portion cooperates with the main body portion of the second valve part to provide a non-return member having check valve functionality.

An "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and/or unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic pump comprising:
a piston rotating group comprising a plurality of reciprocating pistons configured to displace a volume of hydraulic fluid from the pump;

a movable displacement control member that is configured to move within a displacement range to interact with the pistons and vary the displacement of the pump;

a control actuator configured to interact with the movable displacement control member to control the position of the displacement control member within the displacement range; and a displacement control valve assembly configured to provide mechanical feedback control of the position of the control actuator and thereby the displacement control member;

wherein the displacement control valve assembly includes a control valve member that is movable within a fluid flow path of the displacement control valve assembly to control a flow of fluid to or from the control actuator, the control valve member including a first valve part, a second valve part, and a biasing member configured to selectively position one or more portions of the first valve part and one or more portions of the second valve part relative to each other to open or close a vent flow passage in response to an operating state of the pump;

wherein in a normal operating state of the pump, the biasing member is configured to position the one or more portions of the first valve part and the one or more portions of the second valve part relative to each other such that the vent flow passage is closed, and the control valve member is movable in the fluid flow path to control the flow of fluid to or from the control actuator;

wherein in a failsafe state of the pump, the biasing member is configured to position the one or more portions of the first valve part and the one or more portions of the second valve part relative to each other such that the vent flow passage is opened, thereby enabling fluid from the control actuator to escape via the vent flow passage;

wherein the first and second valve parts are discrete parts, and at least in the normal operating state, the first valve part and the second valve part are rigidly-coupled together for common axial movement;

wherein the second valve part is configured as a check valve member, wherein the second valve part separates from the first valve part to open a flow path between the first and second valve parts, wherein the second valve part includes a main body portion and an intermediate portion movable relative to the main body portion;

wherein the biasing member is interposed between the main body portion and the intermediate portion; and wherein the first valve part maintains engagement with the intermediate portion of the second valve part for common axial movement therewith relative to the main body portion.

2. The hydraulic pump according to claim 1, wherein the first valve part of the control valve member is a valve spool, the second valve part of the control valve member is a cap or spring guide that interfaces with a portion of the valve spool, and the vent flow passage includes one or more internal fluid flow passages of the valve spool and/or the cap or spring guide.

3. The hydraulic pump according to claim 1, wherein the second valve part is configured as a spring guide that is operably coupled to a feedback spring on one side of the feedback spring, the feedback spring being operably coupled to the control actuator on an opposite side of the feedback spring.

4. The hydraulic pump according to claim 3, wherein the control actuator is a control piston having an internal fluid chamber, wherein the control piston contains at least a portion of the feedback spring.

5. The hydraulic pump according to claim 4, wherein in a hydromechanical override state of the pump, the flow path opened between the first and second valve parts permits flow from a drain port in the displacement control valve assembly to flow to the internal fluid chamber of the control piston via the flow path between the first and second valve parts.

6. The hydraulic pump according to claim 1, wherein the pump comprises a hydromechanical control including a pressure limiter valve that is configured to preset an activation pressure with a limiter spring, and when a hydromechanical override state is triggered and pressure on the limiter spring exceeds the set pressure and activates the limiter valve, fluid will flow in reverse through a drain passage and into an internal passage of the control spool to exert pressure against the intermediate part, thereby causing the biasing member to compress and unseat a forward end of the spool from a conical interface of the second valve part, thereby allowing pressure to vent to the internal fluid chamber of the control actuator to provide override functionality.

7. The hydraulic pump according to claim 1,
wherein the intermediate portion is slidable within a bore of the main body portion, the biasing member having one end engaged within a recess of the intermediate portion and an opposite end engaged against a wall of the main body portion, and wherein the intermediate portion includes an outer recess configured to engage a forward end of the first valve part.

8. The hydraulic pump according to claim 1,
wherein in the normal operating state, the biasing member is compressed such that the intermediate portion and the main body portion are coupled together at a rigid stop interface, and the first valve part and the intermediate portion are coupled together; and
wherein in the failsafe state, the biasing member is extended such that the intermediate portion is separated from the rigid stop interface of the main body portion, and the first valve part and the intermediate portion are coupled together such that extension of the biasing member positions the first valve part in the displacement control valve assembly to open the vent flow passage.

9. The hydraulic pump according to claim 1,
wherein in the failsafe state, the displacement control valve assembly includes a stop surface of a valve body that restricts movement of the main body portion beyond a predefined position, and the first valve part is movable beyond the predefined position by engagement and movement with the intermediate portion by extension of the biasing member to thereby open the vent passage.

10. The hydraulic pump according to claim 1,
wherein the vent passage includes at least one passage extending through a valve body of the displacement control valve assembly, wherein the at least one passage opens at one end into an internal chamber of the control actuator, and opens at an opposite end into a bore supporting movement of the first valve part.

11. The hydraulic pump according to claim 1, wherein the displacement control valve assembly includes a valve actuator operably coupled to the control valve member, the valve actuator being configured to actuate and move the control valve member, wherein the biasing member and the valve actuator provide opposing forces on the first valve part and the intermediate portion of the second valve part, wherein in the normal operating state, the force provided by the valve actuator is greater than force by the biasing member thereby compressing the biasing member such that the intermediate portion and main body portion are rigidly coupled together at an engagement interface; and wherein in the failsafe state, the force provided by the valve actuator is less than force provided by the biasing member thereby extending the biasing member such that the intermediate portion is separated from the engagement interface and moves the first valve part to open the vent passage.

12. The hydraulic pump according to claim 1, wherein the second valve part has a recess for receiving an end portion of the first valve part, the recess being configured to align and center the first and second valve parts relative to each other.

13. The hydraulic pump according to claim 1, wherein the displacement control valve assembly comprises: a feedback spring having a spring force that changes proportionally with the movement of the control actuator; and a valve actuator; more particularly comprising a solenoid; wherein: the first valve part is a control spool that is moveable between a first position and a second position when the pump is in the normal operating state, and is moveable to a third position when the pump is in the failsafe state; and the feedback spring is operably coupled to the second valve part, the feedback spring being configured to exert the spring force against a first end of the control spool via the second valve part, and the solenoid actuator is configured to exert an actuator force against a second end of the control spool opposite the first end, the actuator force being opposite to a biasing force exerted by the biasing member against the first end of the control spool; a positioning of the control spool between the first position and the second position is determined based on a balance between the spring force and the actuator force acting on the control spool; and the positioning of the control spool between the first position and the second position controls a flow of hydraulic fluid to the control actuator to provide the mechanical feedback control of the position of the control actuator.

14. The hydraulic pump according to claim 13, wherein: the control actuator comprises a control piston; the control spool is in fluid communication with a supply port that is in fluid communication with a supply of hydraulic fluid, with a control port that is configured to provide a flow path of hydraulic fluid to the control piston, with a drain port that is in fluid communication with a low case pressure, and with the vent flow passage configured to provide a flow path of hydraulic fluid from the control piston to the drain port; the positioning of the control spool between the first position and the second position controls a flow of hydraulic fluid among the supply port, the control port, and the drain port to control the flow of hydraulic fluid to the control piston to provide the mechanical feedback control of the positioning of the control piston when in the normal operating state; and the positioning of the control spool at the third position allows the fluid to flow from the control piston to the drain port to provide the mechanical feedback control of the positioning of the control piston when in the failsafe state.

15. The hydraulic pump according to claim 14, wherein the displacement control valve assembly is configured to perform the mechanical feedback control of the positioning of the control piston comprising: when the spring force of the feedback spring is greater than the actuator force of the solenoid actuator, the control spool moves in a first direction from the first position toward the second position; the control spool begins metering flow from the supply port to the control port; the supply port in fluid communication with the control port feeds flow of hydraulic fluid to the control piston until the control piston moves sufficiently to change a swashplate angle to balance the actuator force and the feedback spring force; and at a position of the control spool corresponding to the balance between the actuator force and the feedback spring force, the flow path from the supply port to the control port is shut by the control spool.

16. The hydraulic pump according to claim 14, wherein the displacement control valve assembly is configured to perform the mechanical feedback control of the positioning of the control piston comprising:
when the spring force of the feedback spring is less than the actuator force of the solenoid actuator, the control spool moves in a second direction from the second position toward the first position;
the control spool begins metering flow from the control port to the drain port;
the control port in fluid communication with the drain port connects the control piston to the low case pressure until the control piston moves sufficiently to change a swashplate angle to balance the actuator force and the feedback spring force; and
at a position of the control spool corresponding to the balance between the actuator force and the feedback spring force, the flow path from the control port to the drain port is shut by the control spool.

17. The hydraulic pump according to claim 14, wherein the displacement control valve assembly is configured to perform the mechanical feedback control of the positioning of the control piston comprising: when the solenoid actuator loses power or current is reduced below a threshold level, the biasing force of the biasing member is greater than the actuator force of the solenoid actuator, and the control spool moves toward the third position; at the third position, the flow path from the supply port to the control port is shut by the control spool, and the vent flow passage from the control piston to the drain port is open via relative movement of the valve spool and a spring guide.

18. The hydraulic pump according to claim 13,
wherein the first position corresponds to a swashplate being at a maximum displacement angle, and the moving of the control spool in a first direction results in the control piston acting to reduce a swashplate angle;
wherein the second position corresponds to the swashplate being at a minimum displacement angle, and the moving of the control spool in a second direction results in the control piston acting to increase the swashplate angle; and
wherein the third position corresponds to the swashplate being at a maximum displacement angle, and the moving of the control spool away from the third position results in the control piston acting to reduce the swashplate angle.

19. A hydraulic pump comprising:
a piston rotating group comprising a plurality of reciprocating pistons configured to displace a volume of hydraulic fluid from the pump;
a movable displacement control member that is configured to move within a displacement range to interact with the pistons and vary the displacement of the pump;
a control actuator configured to interact with the movable displacement control member to control the position of the displacement control member within the displacement range; and a displacement control valve assembly configured to provide mechanical feedback control of the position of the control actuator and thereby the displacement control member;

wherein the displacement control valve assembly includes a control valve member that is movable within a fluid flow path of the displacement control valve assembly to control a flow of fluid to or from the control actuator, the control valve member including a first valve part, a second valve part, and a biasing member configured to selectively position one or more portions of the first valve part and one or more portions of the second valve part relative to each other to open or close a vent flow passage in response to an operating state of the pump;

wherein in a normal operating state of the pump, the biasing member is configured to position the one or more portions of the first valve part and the one or more portions of the second valve part relative to each other such that the vent flow passage is closed, and the control valve member is movable in the fluid flow path to control the flow of fluid to or from the control actuator;

wherein in a failsafe state of the pump, the biasing member is configured to position the one or more portions of the first valve part and the one or more portions of the second valve part relative to each other such that the vent flow passage is opened, thereby enabling fluid from the control actuator to escape via the vent flow passage;

wherein the first and second valve parts are discrete parts, and at least in the normal operating state, the first valve part and the second valve part are coupled together for common axial movement;

wherein the second valve part is configured as a check valve member, wherein the second valve part separates from the first valve part to open a flow path between the first and second valve parts;

wherein the second valve part is configured as a spring guide that is operably coupled to a feedback spring on one side of the feedback spring, the feedback spring being operably coupled to the control actuator on an opposite side of the feedback spring; and wherein the control actuator is a control piston having an internal fluid chamber, wherein the control piston contains at least a portion of the feedback spring.

20. A hydraulic pump comprising:

a piston rotating group comprising a plurality of reciprocating pistons configured to displace a volume of hydraulic fluid from the pump;

a movable displacement control member that is configured to move within a displacement range to interact with the pistons and vary the displacement of the pump;

a control actuator configured to interact with the movable displacement control member to control the position of the displacement control member within the displacement range; and a displacement control valve assembly configured to provide mechanical feedback control of the position of the control actuator and thereby the displacement control member;

wherein the displacement control valve assembly includes a control valve member that is movable within a fluid flow path of the displacement control valve assembly to control a flow of fluid to or from the control actuator, the control valve member including a first valve part, a second valve part, and a biasing member configured to selectively position one or more portions of the first valve part and one or more portions of the second valve part relative to each other to open or close a vent flow passage in response to an operating state of the pump;

wherein in a normal operating state of the pump, the biasing member is configured to position the one or more portions of the first valve part and the one or more portions of the second valve part relative to each other such that the vent flow passage is closed, and the control valve member is movable in the fluid flow path to control the flow of fluid to or from the control actuator;

wherein in a failsafe state of the pump, the biasing member is configured to position the one or more portions of the first valve part and the one or more portions of the second valve part relative to each other such that the vent flow passage is opened, thereby enabling fluid from the control actuator to escape via the vent flow passage;

wherein the first and second valve parts are discrete parts, and at least in the normal operating state, the first valve part and the second valve part are coupled together for common axial movement;

wherein the second valve part is configured as a check valve member, wherein the second valve part separates from the first valve part to open a flow path between the first and second valve parts, and wherein the vent passage includes at least one passage extending through a valve body of the displacement control valve assembly, wherein the at least one passage opens at one end into an internal chamber of the control actuator, and opens at an opposite end into a bore supporting movement of the first valve part.

* * * * *